US010385982B2

(12) United States Patent
Patterson et al.

(10) Patent No.: US 10,385,982 B2
(45) Date of Patent: Aug. 20, 2019

(54) ROBUST IN-LINE VALVE

(71) Applicant: Proserv Operations, Inc., Houston, TX (US)

(72) Inventors: Andy Patterson, Katy, TX (US); Preston Weintraub, Spring, TX (US); Billy W. Pilant, Jr., Houston, TX (US)

(73) Assignee: Proserv Operations, Inc., Houston, TX (US)

( * ) Notice: Subject to any disclaimer, the term of this patent is extended or adjusted under 35 U.S.C. 154(b) by 0 days.

(21) Appl. No.: 15/357,974

(22) Filed: Nov. 21, 2016

(65) Prior Publication Data

US 2017/0146139 A1    May 25, 2017

Related U.S. Application Data

(60) Provisional application No. 62/308,340, filed on Mar. 15, 2016, provisional application No. 62/259,183, filed on Nov. 24, 2015.

(51) Int. Cl.
*F16K 15/06* (2006.01)
*F16K 15/18* (2006.01)

(52) U.S. Cl.
CPC ............ *F16K 15/18* (2013.01); *F16K 15/063* (2013.01)

(58) Field of Classification Search
CPC .................................................. F16K 15/026

USPC .......... 137/522, 542, 543, 543.13, 495, 511; 251/63.4, 63.6, 82, 83
See application file for complete search history.

(56) References Cited

U.S. PATENT DOCUMENTS

| | | | | |
|---|---|---|---|---|
| 3,114,391 | A * | 12/1963 | Kurtz .................... | F16K 15/025 137/512.1 |
| 3,662,950 | A * | 5/1972 | McIntosh .............. | F16K 17/003 137/515.5 |
| 3,749,122 | A * | 7/1973 | Gold ..................... | F16K 15/063 137/515.7 |
| 8,342,202 | B2 * | 1/2013 | Nishio ................... | F16L 37/23 137/515 |
| 8,408,244 | B2 * | 4/2013 | Gilcher .................. | E03C 1/104 137/454.2 |

\* cited by examiner

*Primary Examiner* — Kevin F Murphy
*Assistant Examiner* — Patrick C Williams
(74) *Attorney, Agent, or Firm* — Patterson + Sheridan, LLP

(57) ABSTRACT

A poppet valve is provided wherein the poppet and seat are integrally aligned to a bore within a housing of the valve. The poppet is configured to reciprocate within a guide also aligned to the bore, and a spring is provided between the guide and the poppet to bias the poppet against the seat. The poppet guide is positioned, with respect to the bore, by having an alignment portion thereof fixed in a feature of the housing in which it extends, and a second housing secures the feature in the first housing. A pilot, selectively positionable by a piston, is provided to mechanically move the poppet off of the seat.

22 Claims, 16 Drawing Sheets

ROBUST IN-LINE VALVE

CROSS-REFERENCE TO RELATED APPLICATIONS

This application claims benefit of U.S. provisional patent application Ser. No. 62/308,340, filed Mar. 15, 2016 and U.S. provisional patent application Ser. No. 62/259,183, filed Nov. 24, 2015, which is herein incorporated in their entirety.

BACKGROUND OF THE INVENTION

Field of the Invention

The present disclosure pertains to valve, more specifically to valves wherein hydraulic fluid pressure is used to set the positioning of the valve components as between the open and the closed states.

Description of the Related Art

Check valves are used in many applications to control the pressure at or in a hydraulic component. In prior art check valves used in oil and gas production, such as in the control circuits used to hydraulically control fluid flow and pressure among various hydraulically controlled and/or operated components, the selective communication of fluid across the check valve comprises the use of a ball which is spring loaded against a seat. A spring guide is held in place in the outlet bore of the check valve with a snap ring, and a seat, having an opening therein, is located in the outlet bore at a location where the inlet bore meets and communicates with the outlet bore. The ball is disposed in the outlet bore between the spring guide and the seat, and is biased by the spring against a conical or spherical sealing surface surrounding the opening in the seat. The spring is unguided in the space between the end of the spring guide and the ball. When the pressure in the outlet bore is sufficiently less than that in the inlet bore, the force of the spring biasing the ball against the seat is overcome, and the ball is pushed off of the seat and fluid flows through the annular opening between the ball and the adjacent sealing surface of the seat. Again, unless the pressure difference is great, and fluid flow through the annulus formed between the ball and sealing surface is large, the ball will not become grounded against the end of the spring guide, and the ball can wobble within the outlet bore, and is known to rotate in the outlet bore. The wobbling and rotating of the ball causes wear on the ball and the adjacent end of the spring, and the ball can separate laterally from the end of the spring, causing the spring to bind or break. Additionally, the snap ring has been known to fail, which causes the check valve to fail in an open condition.

Additionally, piloted check valves are known, wherein the valve includes a third, control fluid bore connected to a source of control fluid, which is used to selectively bias the end of a pin inserted into a piston against the ball if there is a need to open communication between the outlet and inlet when the pressure difference therebetween is insufficient to open the valve. This occurs, for example, when the outlet pressure exceeds the inlet pressure and there is a desire to vent an overpressure condition in the outlet bore.

SUMMARY OF THE INVENTION

A check valve is provided in which a poppet is used rather than a ball, and the poppet and spring are guided by a poppet guide, ensuring alignment therebetween during operation of the valve. The poppet guide is received within a bore of a first body of the valve, and is secured therein by connection of a second body of the valve to the first body. The seat of the valve is located in the bore of the first body, such that the poppet guide aligns the poppet to the seat. The poppet is configured to include a head portion having a conical sealing face to engage the seat, and a stem extending therefrom and into the poppet guide. The spring surrounds the poppet guide, and is extendable between a ledge on the poppet guide to a ledge on the underside of the poppet head. The poppet guide also limits the travel of the poppet from the seat, to prevent the spring from going solid, i.e., prevents the flans of the spring windings from being contacted with each other over the length and circumference of the spring.

Where desired, a third body, having a poppet pilot configured to open the valve under bias supplied by a control pressure, is connected to the first body. The poppet pilot may be spring biased in the direction away from the poppet, such that when control pressure is applied to the poppet pilot to cause it to move the poppet off of the seat and thereby physically open the check valve, the spring ensures full retraction of the poppet pilot and closing off of the flow passage between the inlet and outlet of the valve when the control pressure is removed such as by the venting thereof. The poppet pilot is also vented in the space between the poppet pilot and the poppet and seat, to allow fluid flow against the side thereof opposite to that to which control pressure is applied. The vent may be to the local environment around the valve, or to the inlet bore of the valve.

The valve seat may include a raised sealing surface thereon, having a smaller area than that of the poppet, which enables plastic, i.e., recoverable, deformation of the seat at the raised seat sealing area, ensuring an effective seal between the seat and poppet.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
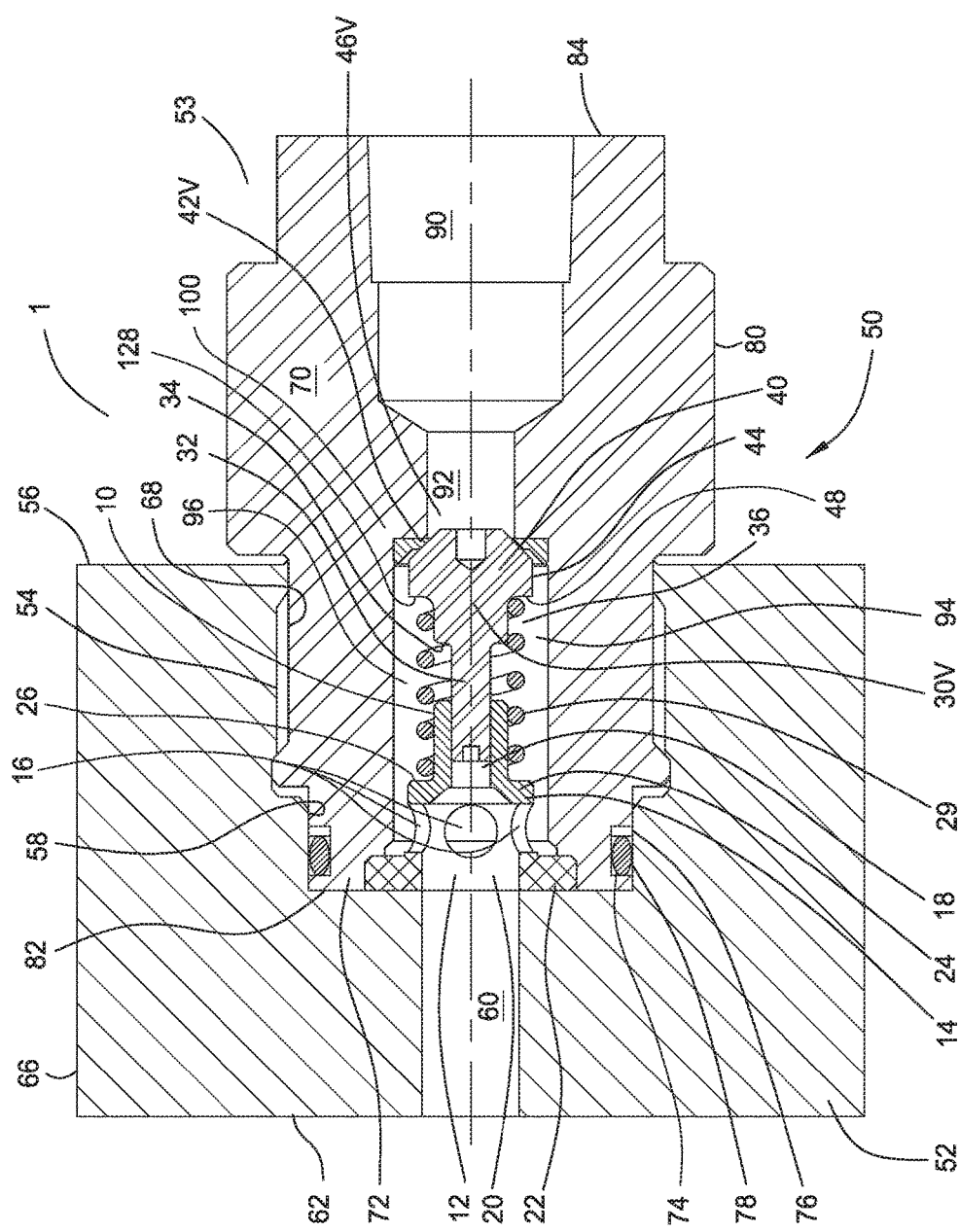
FIG. 1 is a sectional view of an embodiment of the valve hereof.

Referring initially to FIG. 1, an in-line check valve 1 is shown in section, having a poppet guide 10, a seat 100, and a poppet 30 moveable with respect to the poppet guide 10 and the seat 100, all secured within a two piece body 50. A spring 29 is positioned between the poppet guide 10 and the poppet 30, to provide a force biasing the poppet 30 against the seat 100. The two piece body includes a first, female portion 52 which in the embodiment of FIG. 1 forms a cover, having a female threaded bore 54 extending thereinto from a first face 56 thereof. A secondary smooth walled bore 58 having a smaller diameter than the female threaded bore 54 extends inwardly of the female portion 52 from the female threaded bore 54. An outlet flow bore 60 extends from the smooth bore 58 outwardly of the second face 62 of the female portion 52, opposed to first face 56 thereof. Outlet flow bore 60 may be internally threaded to receive a threaded fluid connector, such as an NPT or SAE fitted connection, or the second face 62 may include bolt holes (not shown) extending thereinto to secure a flange over second face 62. The outer circumference 66 of the female portion 52 may have a flatted, i.e., hexagon, octagon or other faceted profile, or a circular profile with flats, or a rectangular profile, to enable the securing of a tool thereon to turn the female portion 52 and male portion 53 with respect to one another.

Two piece body 50 further includes the male portion 53 which is configured to be threaded into, and thus secured within, the female portion 52, and includes therefor a threaded insertion portion 68 extending from a head 70 portion thereof. A generally cylindrical boss 72 extends from the threaded insertion portion 68, and includes a seal groove 74 extending inwardly thereof, within which are located a back-up ring 76 and a seal ring 78, such as an O-ring. In the made-up valve 1, as shown in FIG. 1, threaded insertion portion 68 is threaded into the female threaded bore 54 of the female portion 52, and the boss 72 extends inwardly of the smooth walled bore 58 of the female portion 52 when the threaded insertion portion 68 is threaded into the female threaded bore 54 of female portion 52. The seal ring 78 seals against the base of the groove 74 and the inner circumference of the smooth walled bore 58 to prevent fluid flow therepast.

The head 70, extending outwardly from the first face 56 of female portion 52, is generally configured as a circular or faceted housing configured for attachment of a tool thereto to enable relative rotation between the male and female portions 53, 52, and includes an outer circumferential surface 80, and opposed first and second end walls 82, 84. A flow bore extends through the male portion 53, extending through both the head 70 and threaded extension portion 68. The flow bore includes an inlet flow bore 90 extending from an opening in first end wall 82, which then extends into a reduced diameter guide bore 92, which then opens into a poppet bore 94 having a larger diameter than guide bore 92 and which opens through an opening in the second end face 82 forming the end of the boss 72. A counterbore 96 extends inwardly of second end face 82 and surrounds the end of the poppet bore 94 opening into second end face 82. Male portion 53 and female portion 52 together form a flow passage therethrough which is selectively closed by the poppet 30 sealing against the seat 100 which is disposed where the poppet bore 94 opens into the guide bore 92.

Poppet guide 10 is received in, and extends inwardly of, poppet bore 94 and includes an extended internal flow passage 12 bounded by a circular wall 14 through which a plurality of flow openings 16 extend to allow fluid flow through the poppet guide 10. Poppet guide 10 further includes, extending from internal flow passage 12 in the direction of guide bore 92, a hollow cylindrical guide passage 18. Internal flow passage 12 is bounded by a flanged opening 20 from which a flange 22 extends, and an annular wall 24 the outer surface of which forms a ledge 26, from which a cylindrical guide wall 28 extends and surrounds the guide passage 18. A poppet spring 29 is bounded, at one end thereof, on the ledge 26 formed by the annular wall 24. Flange 22 is received in the counterbore 96, and secured therein by being backed by the annular wall 68 of the female portion 52 surrounding the outlet bore 60.

Poppet 30 includes a generally circular stem 32 received in, and slidingly moveable in, the guide passage 18, and an enlarged head including a lower annular limit ledge 34 facing the end of guide passage 18 and extending from a first circumferential wall 36 of the enlarged head, and a conical head 40. Conical head 40 includes a conical sealing face 42 extending between a second circumferential wall 44 of the circumferential portion 36 and the end face 46 thereof which faces the poppet guide bore 94. On the underside of the conical head 40 and facing the poppet guide 10, an annular spring ledge 48 extends between first and second circumferential walls 36, 44. The second end of the poppet spring 29 bears against the annular spring ledge 48 to urge the poppet 30 in a direction away from the poppet guide 10. The outer diameter of the circumferential portion 36 and the cylindrical guide wall 28, are, within tolerance limits, preferably the same. By providing the circumferential portion 36 and the cylindrical guide wall 28 with the same diameter, and locating the stem 38 in the guide passage 18, the poppet 30 and poppet guide 18 provide along the circumferential portion 36 and the cylindrical guide wall 28 a spring guide which ensures alignment of the spring with the poppet guide 10 and poppet 30, and reduces the likelihood of the spring 29 buckling. Additionally, the distance between the internal end of the cylindrical guide wall 28 facing the annular limit ledge 34, and the spring 29, is sized to ensure that the spring 29 does not become disengaged from the annular limit ledge 34 and ledge 26 when the poppet 30 is fully seated in the seat 100, and also, if the poppet is fully moved away from the seat 100, the annular limit ledge 34 engages the inwardly extending end of the cylindrical guide wall 28 before the spring is compressed to a solid condition, i.e., where the sides or flanks of the coils are all in contact along the length of the spring 29 commonly known as going solid.

Figure 2:
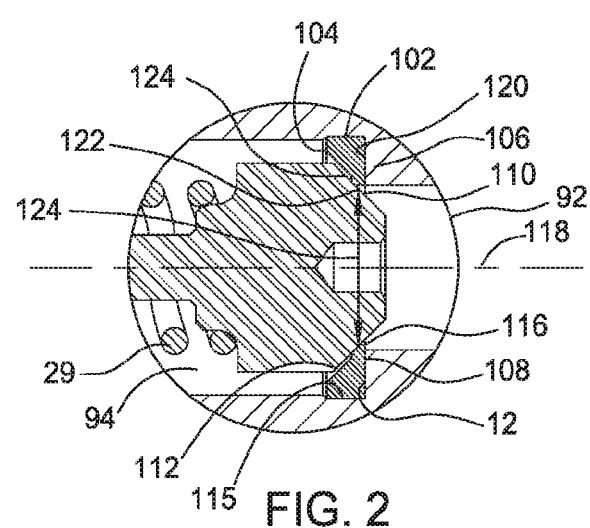
FIG. 2 is an enlarged view of the interaction of the poppet and seat of the valve of FIG. 1, when the valve is in a closed position.
Figure 3:
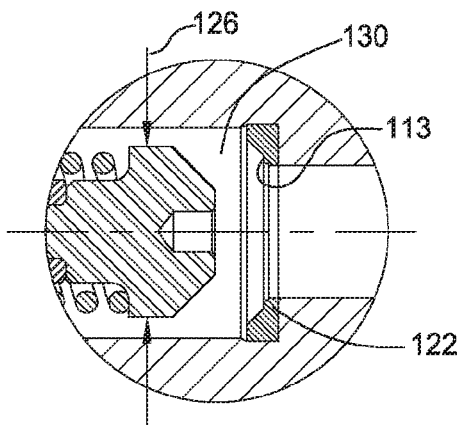
FIG. 3 is an enlarged view of the interaction of the poppet and seat of the valve of FIG. 1, when the valve is in a fully open position.

Referring now to FIGS. 2 and 3, in FIG. 2 the poppet 30 is biased against the seat 100 to close off flow through the valve, i.e. from inlet flow bore 90 to outlet flow bore 60, and in FIG. 3 the poppet 10 is moved away from the seat 100 and fluid may flow from inlet flow bore 90 to outlet flow bore 60. Seat 100 is a generally annular member, having an outer circumferential wall 102, a poppet side annular face 104, and inlet side annular face 106, and a contoured inner wall 108 surrounding an opening 110 therethrough. Contoured inner wall 108 includes a frustoconical wall 112 extending from the poppet side annular face 104 in the direction of inlet side annular face 106 and opening 110, from which an annular seat wall 114 extends generally parallel to the inlet side annular face 106. A generally cylindrical wall 116 surrounds the opening 110, the surface of which extends generally parallel to the centerline 118 of the valve and generally perpendicular to the annular seat wall 114 and the inlet side annular face 106. A second frustoconical wall 113 extends between cylindrical wall 116 to annular seat wall 114. The span of the second frustoconical wall 113 is smaller, preferably substantially smaller than, the span of frustoconical wall 112. Seat 100 is located in poppet bore 94, and the inlet side wall 116 is located against the annular ledge 120 formed where the guide bore 92 meets and opens into the poppet bore 94. The outer diameter of the seat 100 is larger than the inner diameter of the poppet bore 94, and thus the seat 100 is press fit in the poppet bore 94 so that it will not back away from the annular ledge 120 extending between the guide bore 92 and poppet bore 94 when fluid is flowing from inlet bore 90 to outlet bore 60. A cylindrical recess 115, equal in width to the width of the seat 100, may be provided in the poppet bore 94 adjacent to the annular ledge 120, such that the seat 100 can be secured against movement within the poppet bore 36.

When, as shown in FIG. 2, the poppet 10 is biased by spring 29 to engage against the seat 100, the portion of the seat bounded by the annular seat wall 114, the second frustoconical wall 113 and the cylindrical wall 116 surrounding the opening forms an extending portion 122 of the seat 100 extending outwardly from frustoconical surface 112, in the direction of poppet 10. This extending portion 122 can more readily plastically deform as a result of the spring biased force of the conical sealing face 42 of poppet 10 there against, in part because the contact area between the conical sealing face 42 and the seat is reduced thus increasing the pressure of engagement as compared to a case where the entire conical sealing face 42 contacts the seat 100, and in part because annular seat wall 114 and cylindrical wall 116 are unrestrained against bulging outwardly from the body of seat 100, as compared to the portions of the seat 100 contacting the inner wall of the poppet bore 94 and annular ledge 120. Thus, a better seal, as compared to a full contact poppet face against the seat, can be affected, and design tradeoff between the spring 29 force and the size of the second frustoconical wall are possible.

The extending portion 122 of the head 40 of poppet 30 within the envelope of the opening 110 of seat is exposed to the fluid conditions of the inlet bore 90. In the embodiment shown, the poppet 30 is a cylindrical body, and the diameter 124 expressed at the point of contact between the poppet 10 head 40 and the extending portion 122 of the seat 100 which is exposed to the guide bore 92 communicating with the inlet bore 90 defines the force resulting from fluid pressure on the extending portion 122 of the head 40 exposed to guide bore 92. Because the poppet 30 is cylindrical, this force is a function of fluid pressure times the exposed area of the head 40, in terms of $(\pi \times D^2 \times P)/4$, where D is the diameter 124 and P is the fluid pressure in guide bore 92. The pressure in the poppet bore 94 bears against the full area of the other side of the poppet 30 and the force on the poppet is expressed as $(\pi \times d^2 \times p)/4$, where d is diameter 126 (FIG. 3) across the second circumferential wall 44 and p is the pressure in the poppet bore 94. This is because the areas of the base 128 of the stem of annular spring ledge 48 and annular limit ledge 34 sum to the area expressed as $(\pi \times d^2)/4$. Thus to open the valve 1 to allow flow therethrough from inlet bore 90 to outlet bore 60, $(\pi \times D^2 \times P)/4$ must exceed $(\pi \times d^2 \times p)/4$ plus the force of the spring 29 biasing the poppet 100 in the direction of the seat 100. When this occurs, the poppet 30 begins moving from the position thereof shown in FIG. 2 to the position thereof shown in FIG. 3. As the poppet 30 moves away from contact with seat 100, an annular gap 130 begins to open between the poppet 30 and the seat 100, and fluid begins to flow in the direction F across the annular gap. As this fluid flows, the pressure in poppet bore 94 increases. Depending upon the difference in pressure between the inlet bore 90 and the outlet bore 60, the poppet 30 may continue to move to the full open position of FIG. 4. In this position the largest annular gap 130 is present and annular limit ledge 34 of the poppet 30 is engaged against the inner terminus of cylindrical guide wall 28, and the annular gap 130. The size of the maximum annular gap 130 occurs when the annular limit ledge 34 of the poppet 10 engages against the end of the cylindrical guide wall 28 surrounding the guide passage 18. As pressure in the guide bore 92 and poppet bore 94 at some point begin to approach equilibrium with each other, the force expressed as $(\pi \times D^2 \times P)/4$ will no longer exceed $(\pi \times d^2 \times p)/4$ plus the force of the spring 29, and the poppet 30 will begin moving to the position shown in FIG. 2, to seal the opening of the valve by the enlarged head 40 sealing against seat 100. The poppet 10 is sized, with respect to the distance between the seat 100 and the end of the cylindrical guide wall 28 against which annular limit ledge 34 engages, such that stem 32 remains within the guide passage 18 when the poppet 30 is sealing against the seat 100. Additionally, the surfaces of the second frustoconical wall 113 and of the conical sealing face 42 will wear during use. However, the length of stem 32 extending from the head 40 of the poppet is sized such that the stem 32 will continue to be retained in the guide passage 18 during sealing and seating of the conical surface 42 against the mating surface of the seat 100 as the frustoconical wall 113 and of the conical sealing face 42 wear. As the sealing surface of the second frustoconical wall 113 is worn, the extent of wear can result in the second frustoconical wall 113 becoming worn down to the level of the frustoconical wall 112. However, due to the construct of the second frustoconical wall 113, the diameter 124 will remain substantially the same as the second frustoconical wall 113 wears. Also, if the second frustoconical wall 113 is worn down to the level of the frustoconical wall 112, diameter 124 will remain the same, as it is dictated by the inner diameter of the opening 110, and, the valve will continue to seal, because the sealing surface of the seat 100 against poppet 30 conical sealing surface 42 will be larger, and include both the frustoconical wall 112 surface plus the worn second frustoconical wall 113 surface. In this way, the sealing and seating surfaces of the valve can continue to operate effectively even as the seat 100 sealing surfaces wear.

Valve 1 is configured for ease of assembly and repair. To assemble valve 1, seat 100 is first pressed into the poppet bore 94 in male portion 53, until the inlet side annular face 106 thereof contacts annular ledge 120. Then, spring 29 is placed over poppet guide 10, and the poppet stem 32 is inserted into the guide passage 18 in the poppet guide 10. This assembly is then slid inwardly of the end of poppet bore 94 opening into extension portion end face 85, such that flange 22 is received in counter bore 96. Seal 78 and back up ring 76 are located in seal groove 74. The male portion is then, or previously, placed so that the threaded insertion portion 68 faces upwardly, and the female portion 52 is positioned thereover, and threaded bore 54 is threaded onto the threaded insertion portion 68.

Figure 4:
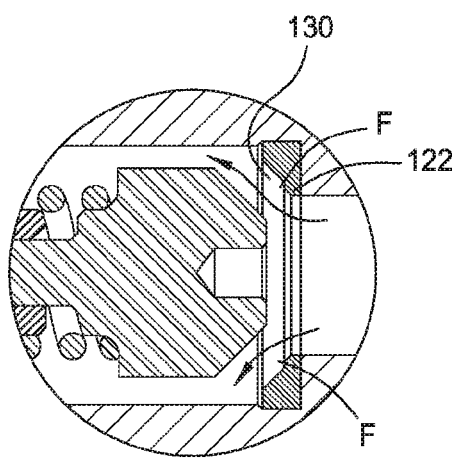
FIG. 4 is an enlarged view of the interaction of the poppet and seat of the valve of FIG. 1, when the poppet of the valve is between the fully open and closed positions.
Figure 5:
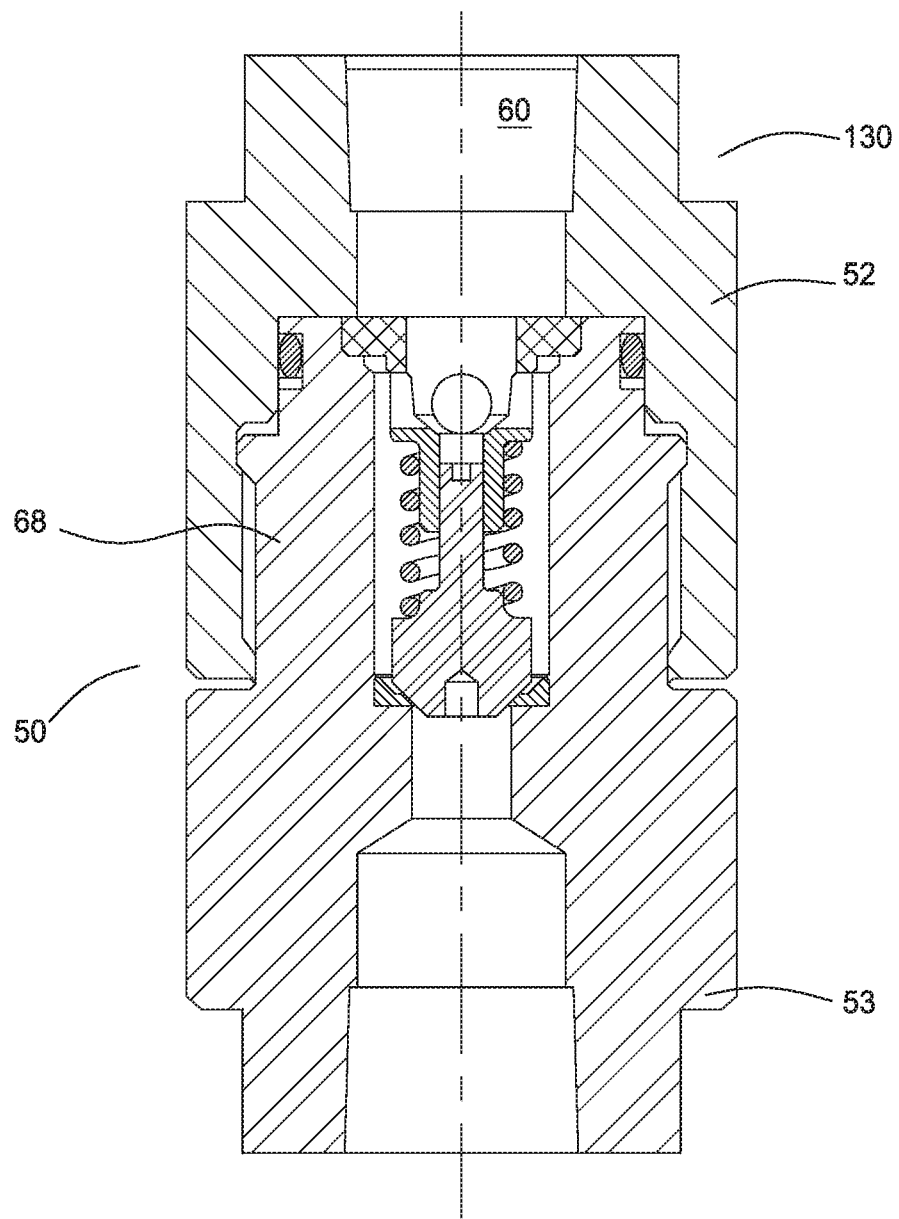
FIG. 5 is a sectional view of an alternate construct of the valve of FIG. 1.
Figure 6:
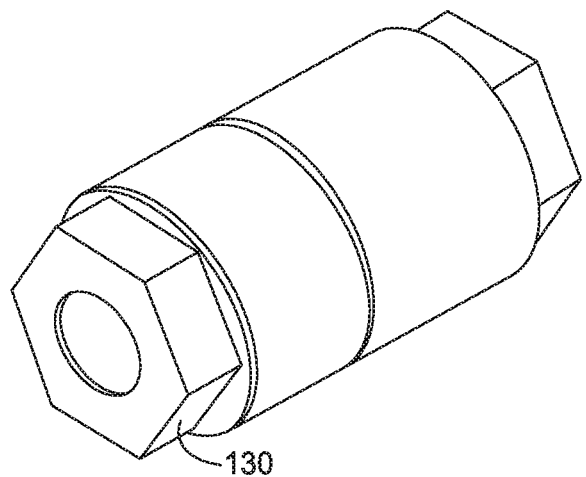
FIG. 6 is a perspective view of the valve of FIG. 5.
Figure 7:
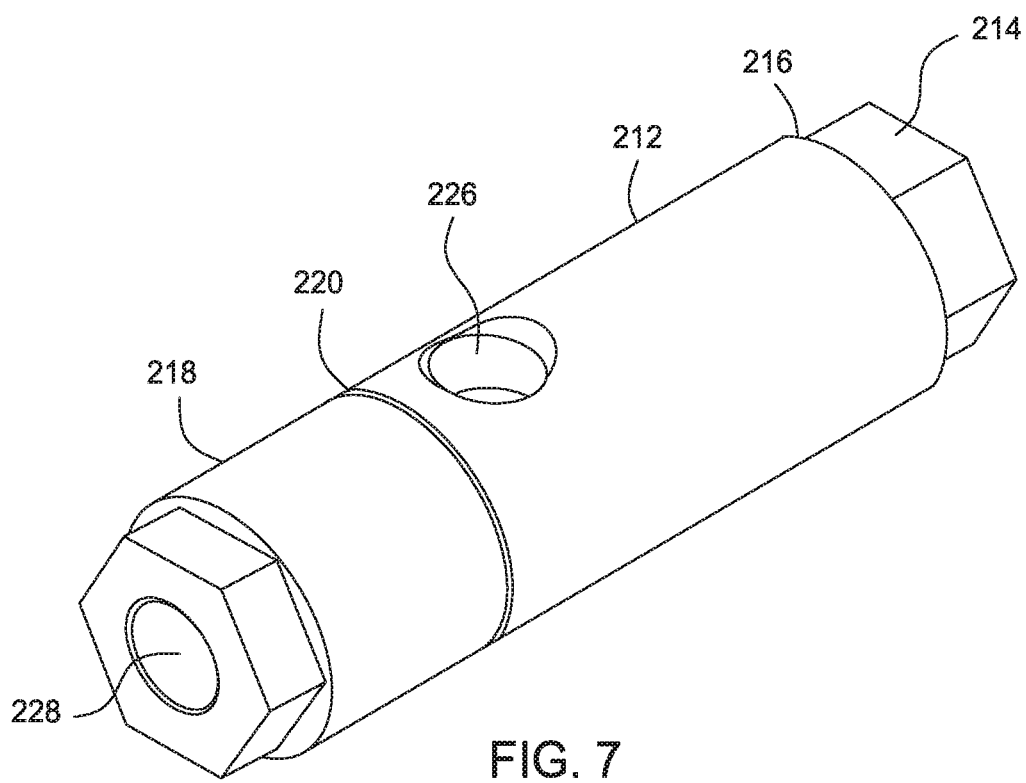
FIG. 7 is a perspective view of the valve hereof, further including a piloted piston.

Referring to FIGS. 5 and 6, an alternate construct of valve 1 is shown. In this construct, female portion 52 is not configured as a cover, but instead outlet bore 60 is threaded for receipt of a threaded connection, such an NFT or SAE fitting or threaded piping or tubing. Additionally, the outer surface is configured in a cylindrical (round) form, which may have a hex, flatted or otherwise configured tool surface 130 against which a tool can bear to torn the female portion 52 to thread it over the threaded insertion portion 68 of male portion 53. The remainder of the valve components and operation are the same as those shown with respect to FIGS. 1 to 4.

The operation of the valves shown in FIGS. 1 to 6 are controlled solely by the fluid pressure on opposite sides of the enlarged head 40 of the poppet 30, and the force of spring 29, and are one way valves, in that if the pressure on the outlet side exceeds that on the inlet side of the valve, the poppet 30 cannot be backed away from the seat 100 and the higher pressure at the outlet side cannot be relieved.

Referring to FIGS. 7 to 10, an additional embodiment of an in line check valve 200 is shown, which is configured to include a pilot piston which is configured to mechanically push the poppet 30 off of the seat 100. Check valve 200 has the same general structure of the check valve 1 operating components, such as the poppet 30, spring 29 and poppet guide 10, except the male potion of the valve is modified to receive a third body having the poppet piston therein, from which a poppet stem protrudes to mechanically engage and selectively move the poppet 30 off of seat 100. Valve 200 includes a main body 212, a first cap 214 disposed within, and sealingly engaging, a first end 216 of the main body 212, and a second cap 218 received on, and sealingly engaging, a second end 220 of the main body 212 distal from first end 216 thereof. Extending inwardly (or outwardly) of valve 200 are a pilot bore 224 which is generally centered in the body of the first cap 214, a fluid inlet port 226 extending inwardly of the outer surface of the main body 212, and an outlet 228 extending through the second cap 218. In use, the valve 200 is configured to allow fluid to flow through the inlet 226 and the main body 212 and out the outlet 228 when the pressure at the outlet 228 falls below a desired pressure, and close off the fluid flow path when the desired outlet 228 pressure, or a balance in pressure at the inlet 226 and outlet 228, is achieved. Additionally, by providing a sufficient control pressure to the pilot bore 224 of the valve 10, as will be described with respect to FIGS. 8 to 10, the passage between the inlet 226 and outlet 228 may be opened by moving the poppet 30 off of the seat 100, to allow relief of an overpressure condition at the outlet 228.

Figure 8:
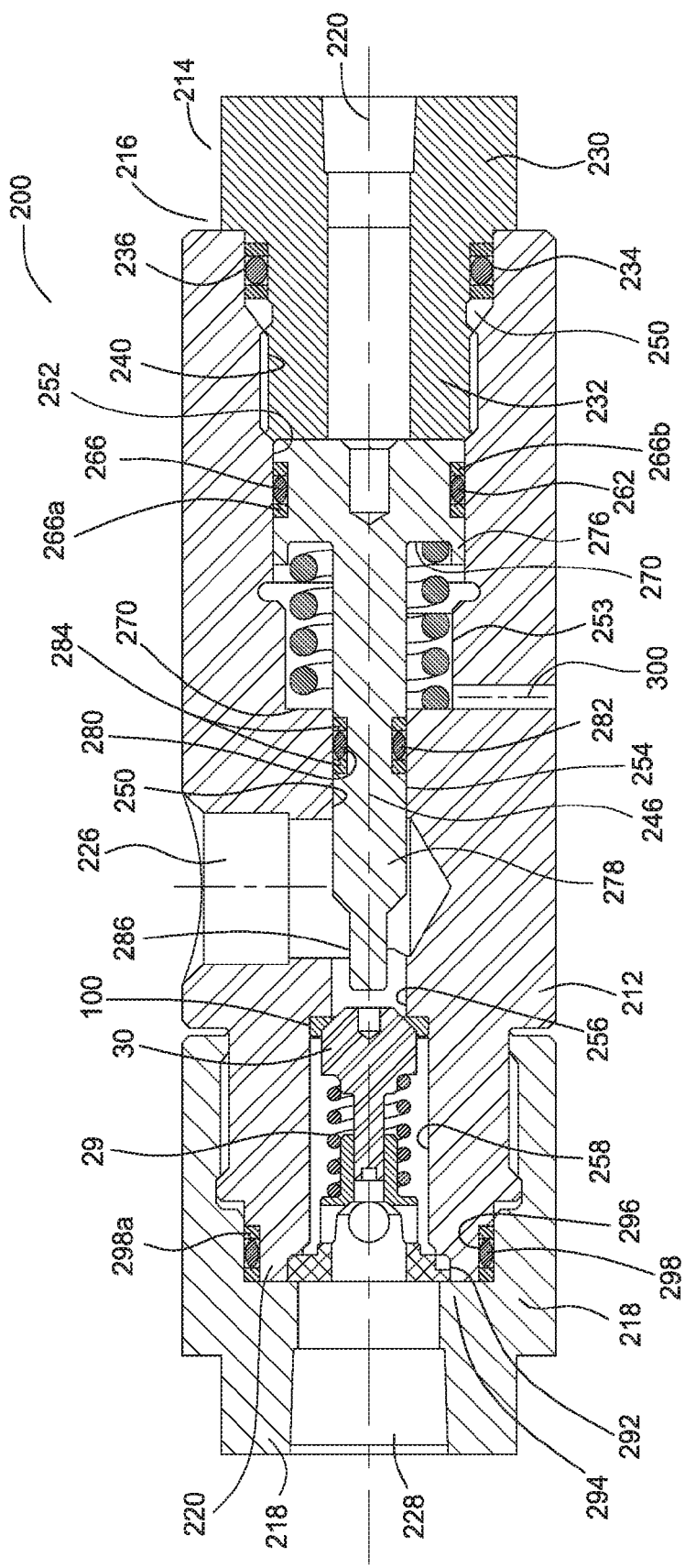
FIG. 8 is a sectional view of the valve of FIG. 7 wherein the valve is in a closed position.
Figure 9:
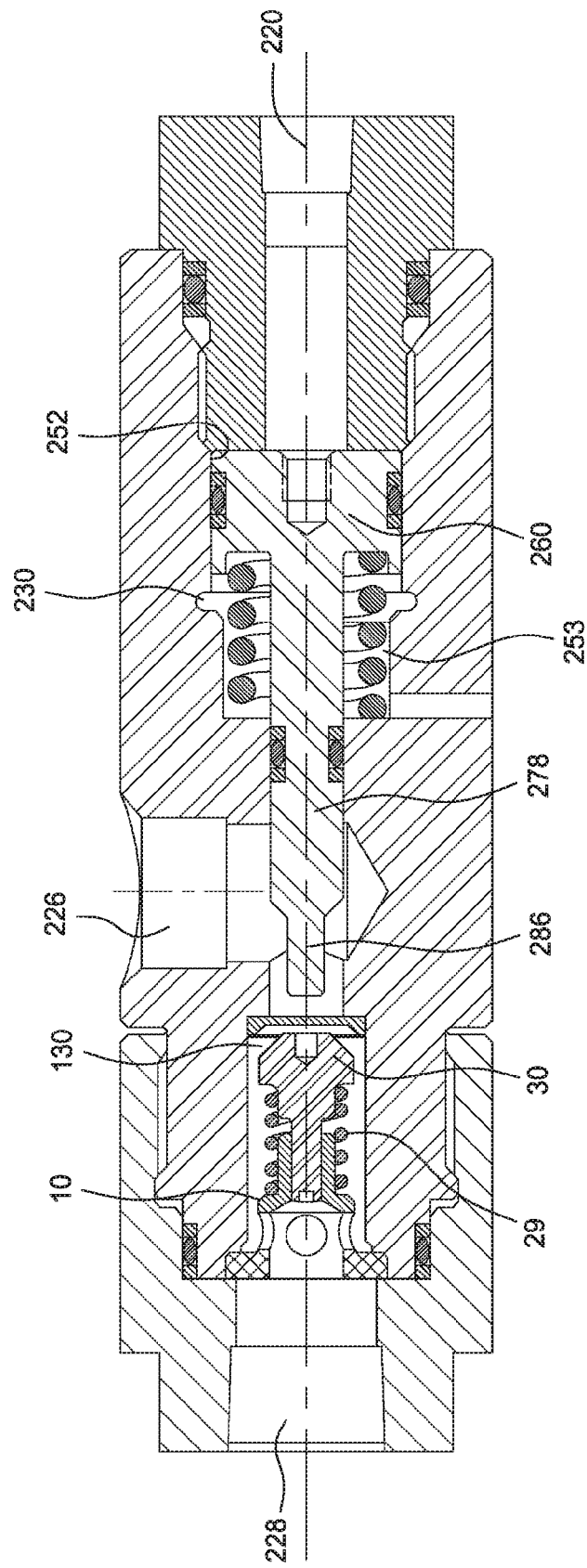
FIG. 9 is a sectional view of the valve of FIG. 7, wherein the valve is in an open position.
Figure 10:
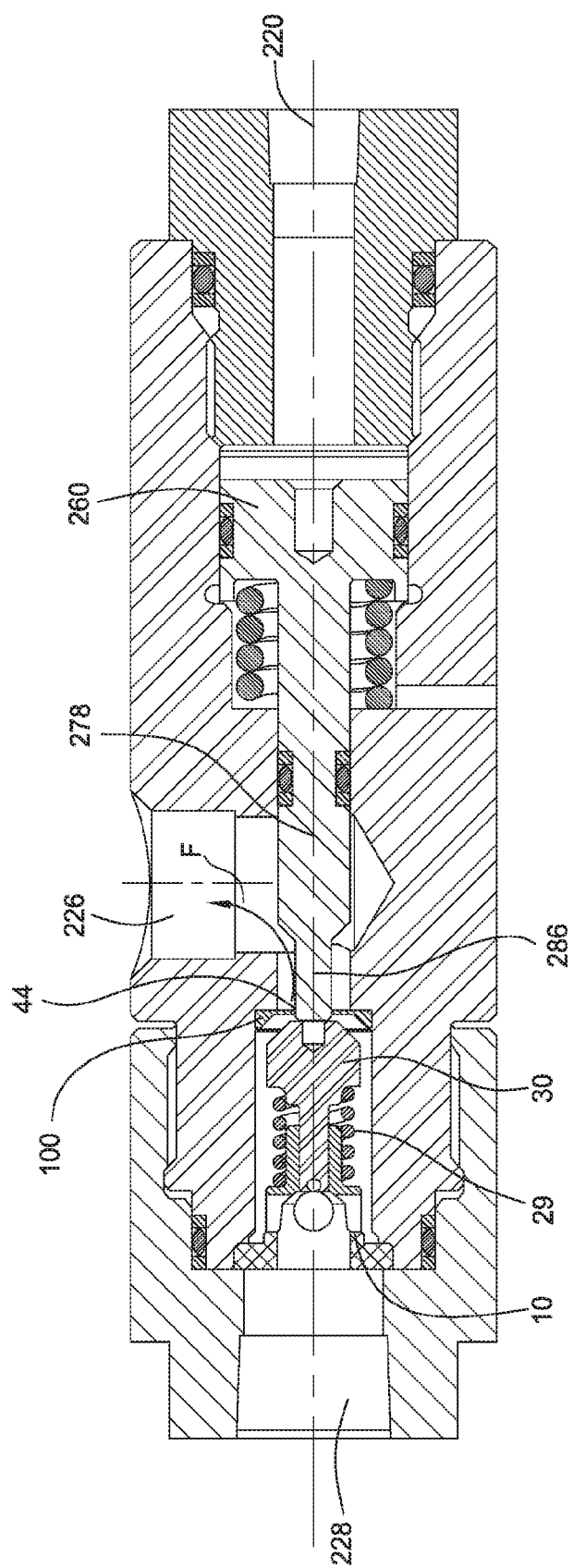
FIG. 10 is a sectional view of the valve of FIG. 7, wherein the poppet of the valve is in an open position as a result of mechanical intervention of the pilot.

Referring now to FIGS. 8 to 10, the valve 200 is shown in section. First cap 214 includes a head portion 230, from which extends a threaded portion 232, and a seal groove 234, having a seal such as an o-ring 236 and a back-up ring disposed therein. Threaded portion 232 of first cap 214 is threadingly received in a mating threaded bore 240 extending inwardly of first end 216 of the main body 212. Pilot bore 224 extends through first cap 214 and communicates directly with a piston bore 252.

Main body 212 is configured to include a passage 250, having different diameters at different locations, extending from the first end 216 to the second end 220 thereof. Poppet guide 10, having the poppet 30 and spring 29 assembled therewith, is received inwardly of the through bore 250 at the second end 220 of main body 212, and a control piston portion 246 extends inwardly of the through passage 250 inwardly of the first end 216 of the main body 212. Control piston portion 246 is operable to move the poppet 30 off of the seat 100 during an overpressure condition at valve outlet 228. Passage 250 includes the threaded bore 240 extending inwardly of first end 214 of main body 212, a piston bore 252 extending therefrom having a which terminates in fluid communication with a spring bore 253 having a smaller diameter than piston bore 252, and a stem bore 254 extending therefrom to intersect with the inlet 226. From inlet 226, passage 250 extends as a lead bore 256 in the direction of outlet 228 and into poppet bore 258. The poppet bore 258 opens into the outlet 228 in second cap 218.

Control piston portion 246 includes a piston 260, having a seal groove 262 extending thereinward about its circumference, within which an o-ring 264 is sandwiched between opposed back up rings 266a, b. Piston 260 is slidingly received in piston bore 252, and the travel thereof in the longitudinal direction is limited in the direction away from the poppet bore 258 by engagement thereof against the innermost extent of the first cap 214, and in the direction toward the poppet bore 258 by an annular ledge 230. Spring bore 253 extends inwardly of the valve from piston bore 252, in the direction of the poppet bore 258.

At the connection of the spring bore 253 and the pilot bore 254, an annular spring ledge 270 is formed. A spring, such as a coil spring 274 is disposed between spring ledge 270 and inner recessed wall 272 of the piston 260 to provide a bias urging piston 260 in the direction away from the poppet 30. The annular inwardly extending recessed wall 272 of the piston 260 is, in the embodiment, inwardly recessed into the end face of the piston 260, to form an annular spring retaining lip 276 which helps center the spring 274 with respect to the diameter of the piston 260. The inner diameter of the annular retaining lip 276 and the inner diameter of the spring bore 253 of the piston bore 252 are, within tolerance limits, the same, and are also centered, within tolerance limits, along the centerline of the valve 200. The inner surface of the annular retaining lip 276 and of the spring bore 253 form a spring guide to maintain the alignment of the spring 274 along the length of the piston 260 stroke. Piston portion 246 also includes an extending poppet stem 278, which is a generally right cylindrical integral extension of piston 260 having a seal groove 280 inwardly of the outer circumference thereof, within which a seal ring such as an o-ring 282, sandwiched between opposing back up rings 284a, b, is received. O ring 282 provides the seal between poppet stem 278 and stem bore 254, and also helps center the poppet stem 278 in the stem bore 254 and the lead bore 256. Likewise, seal 264 seals the interface between piston 260 and piston bore 252. Poppet stem 278 includes, at the end thereof distal from the piston 260, a reduced diameter portion 286, to provide a reduced area annular passage between the reduced diameter portion 286 and the inner surface of the lead bore 256.

Second cap 218 extends over the second, threaded, end 220 of the main body and is thereby connected thereto with mating threads. Second cap includes outlet 228 extending thereinto which opens into the poppet bore 258 in main body 212 extending therefrom in the direction of inlet 226. The second end 220 of the main body 212 also includes a counterbored poppet guide recess 292 extending inwardly of the poppet bore 258, into which the flange 22 of the poppet guide 10 is received. The poppet guide 10 has the same configuration and function as that described for the poppet guide 10 with respect to FIGS. 1 to 5. The poppet guide 10 is maintained in the counterbored poppet guide recess 292 by the annular second cap flange 294 surrounding the outlet 228 and abutting the second end 220 of the main body 212 and a portion of the flange 22. A seal groove 296 extends inwardly of the outer surface of the main body 212 inwardly of second end 220, and an o-ring 298 and back up ring 298a are received therein. O-ring 298 provides a seal between main body 212 and second cap 218.

As in the embodiment of the valve 1 of FIGS. 1 to 5, poppet 30 is reciprocally disposed with poppet guide 10, and poppet spring 29 extends therebetween to bias the poppet 30 away from poppet guide 10 in the direction of seat 100. In FIG. 8, by aligning the poppet guide 10 using the counterbored cylindrical recess 292 extending inwardly of the second end 220 of the main body 12, the poppet guide 10 is precisely aligned to the inner surface of the poppet bore 258. As the seat 100 is press fit into the poppet bore 258, the poppet guide 10 is also precisely aligned with the opening 110 and the frustoconical walls 112, 113 in the seat 100 (FIG. 4). Additionally, the poppet 30 position, vis-à-vis the poppet bore 258 and seat 100, is controlled by sliding movement of the poppet stem 32 in the guide passage 18. As a result of this configuration, the alignment of the conical sealing face 42 of the poppet 30 is ensured with the frustoconical second wall 113, and upon wear thereof, the worn frustoconical second wall 113 and frustoconical wall 112 of the seat 100 (FIGS. 2 to 4). This leads to a valve structure with low wear characteristics, reliable operation as parts are maintained in alignment, and ease of assembly, and replacement of internal components, thereof.

FIG. 8 shows the position of the control piston portion 46 and a poppet 30 when the valve 200 is at rest, i.e., where the force of the pressure at the inlet 226 on the portion of the poppet 30 exposed to inlet bore 226 does not exceed the force of the pressure at the outlet 228 acting on the poppet 10 surfaces exposed to poppet bore 258 plus the bias force of the spring 29 urging the poppet 30 against the seat 100, and the outlet 228 pressure is not in an over pressure condition. This can occur while the valve is in use, and the outlet 228 of the valve 200 is ported to a fluid component such as an accumulator, and inlet 226 is ported to an inlet fluid supply. When the pressure at outlet 228 (and thus supplied to or resident in a component downstream therefrom) is at the desired level, valve 200 will maintain the inlet 226 isolated from the outlet 228. Thus, as shown in FIG. 8, the poppet spring 29 presses the poppet 30 in the direction of the seat 100, sealing off the flow passage through the opening 110 (FIGS. 2 and 3) in seat 100 between the inlet 226 and outlet 228. In this valve 200 condition, piston 260, and thus stem 246, are biased by spring 274 in the direction of first inlet 222, and thus stem 246 is not in contact with poppet 30.

In response to a need to communication fluid to a component located downstream of the valve outlet 228, or in the event that the pressure at the outlet side of the valve is less than desired, and less than that at inlet 226, once the difference in pressure between the higher inlet and lower outlet pressures exerts a force on the portion of the poppet 30 exposed to the inlet 226 pressure greater than the bias force of the spring 29 urging the poppet 30 against the seat 100, the poppet 30 begins to move in the direction of the outlet 228, and cracks away from the seat 100 forming an annular flow passage 130 therebetween as shown in FIG. 9. At this point, fluid will pass from inlet 226 to outlet 228 so long as the pressure in the inlet 226 is sufficiently greater than that in the outlet 228, such that the force of the poppet spring 29 is overcome. As the pressures on either side of the annular flow passage 130 equalize, the poppet 30 is urged back against the seat 100 by poppet spring 29, and the valve 200 returns to the condition shown in FIG. 8.

As the spring loaded poppet 30 and seat 100 structure form a one way valve, the valve 200 cannot inherently relieve pressure at the outlet 228 by flowing fluid in the direction of from the outlet 228 to the inlet 226. Therefore, the valve 200 includes the control piston portion 246 having piston 260. By applying fluid under sufficient pressure into pilot bore 224 to cause the force of piston 260 to overcome the pressure exerted thereagainst from inlet 226 side and the springs 274 and 29, the end of the reduced diameter portion 286 of the poppet stem 278 is moved against the end face 44 of the poppet 30, pushing it in the direction of the outlet 228 to form annular flow passage 130 and allow fluid to flow as shown by arrow F from the outlet 228 to the inlet 226 as shown in FIG. 10. The movement of the piston 260, and thus the poppet stem 278, is bounded by the internal end of the first cap 214 and the ledge 230 extending inwardly of the piston bore 252. The pressure applied to inlet 222 must be sufficient to overcome the effective force caused by the difference in pressure on the opposed sides of the poppet, and the springs 29, 274. However, as the diameter of piston bore 252 acting against the effective area of the piston 260 facing first cap 214 is approximately four times that of the area of the poppet 30 exposed to the pressure at inlet 226, for the same pressure at inlets 222 and 226, piston 260 will exert four times the force against the poppet 30 at the end of poppet stem 278.

To operate the piston 260, the pressure at the outlet 228 is remotely monitored (not shown), and if an overpressure condition is encountered at outlet 228, sufficient pressure is applied to pilot bore 224 to cause the poppet 30 to be moved off of the seat 100 to relieve the overpressure condition. When the poppet 30 is first moved off of the seat 100, the annular flow area 130 is smaller than the annular area between the reduced diameter portion 286 of the poppet stem 278 and the inner wall of the lead bore 256, and the annular gap 130 forms an orifice limiting fluid flow from outlet 228 to inlet 226. As the poppet stem 278 moves to its greatest extent in the direction of the poppet 30, the annular limit ledge 34 remains spaced from the end of the cylindrical guide wall 28, and the annular flow area 130 is greater than the annular area between the reduced diameter portion 286 of the poppet stem 278 and the inner wall of the lead bore 256, and the annular area between the inner wall of the lead bore 256 and the reduced diameter portion 286 of the poppet stem 278 forms an orifice limiting fluid flow from outlet 228 to inlet 226.

When the overpressure condition at outlet 228 is relieved, the pressure at pilot bore 224 is reduced, or even vented, and the spring 29 urges the poppet 30 to seal against the seat 100. A vent passage 300 extends from the piston bore 252 to the exterior of the main body 212, to enable the increasing volume of the piston bore 252, as the piston 260 moves toward the pilot bore 224, to receive fluid from the ambient surrounding the valve, to prevent a "vapor lock" condition by which a vacuum pressure is formed in the piston bore 252 when the piston 260 moves in the direction of the pilot bore 224.

The engagement of the piston 260 against ledge 170 as shown in FIG. 10 is provided to prevent the poppet 30 from bottoming out against the cylindrical guide wall 28 of the poppet guide 10 when the valve 200 is operated to relieve an overpressure condition, and to limit the compression of the coil spring 274 so that it does not become fully compressed. Thus, the maximum width of the annular gap 130 when the valve is operated to open the poppet 30 in an over pressure condition may be smaller than the maximum width of the annular gap 130 when the poppet 30 is backed away from the seat 100 in response to the inlet 226 pressure causing poppet 30 to move off of seat 100.

To assemble the valve 200, spring 278 and piston 260, with the back-up rings 266a and seal 266 in the seal groove 262 thereof, are inserted inwardly of the piston bore 252, and the threaded portion 232 of the first cap 214 is threaded into the threaded bore 240 of the main body 212. Poppet guide 10, with poppet 30 and spring 29 assembled therewith, is inserted into poppet bore at the second end 220 of the main body, such that annular flange 22 is received within the counterbored recess 92, and then the second cap 218 is threaded over second end 220 of main body 212 after seal 298 and back up ring 298a are positioned in seal groove 296.

Figure 11:
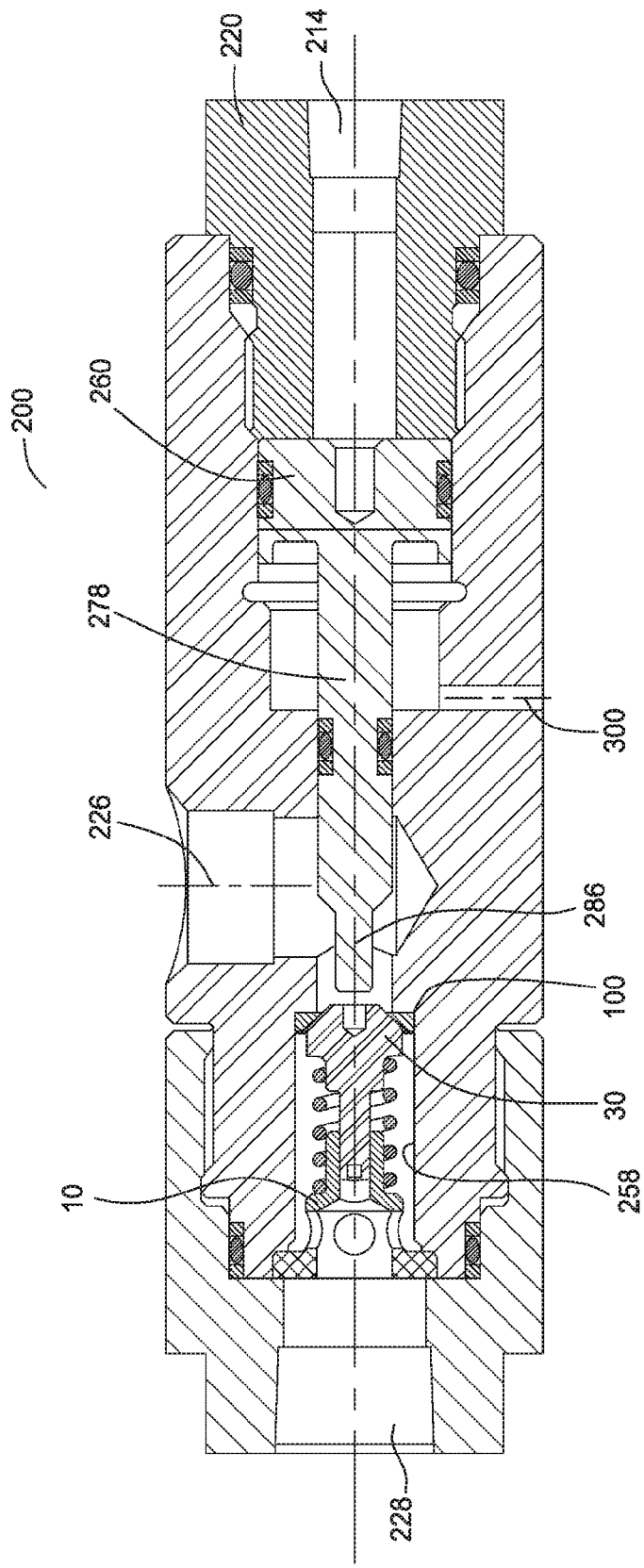
FIG. 11 is a sectional view of an alternate construct of the valve of FIG. 7.

Referring now to FIG. 11, an alternate construct of the valve 200 is shown. In this alternate construct, spring 274 which is used in the embodiment of FIGS. 7 to 10 to bias the piston 260 into a retracted position away from the poppet 30 is eliminated, and movement of the piston 260 in the direction of the pilot bore 224 when the pilot bore 224 is vented, is a function of the ambient fluid pressure around the valve 200 exceeding the pressure in vented pilot bore 224, such that fluid of a higher pressure enters piston bore 252 through the vent 300 and urges the piston 260 to move against the inner terminus of the first cap 214. Initially, the higher pressure in the poppet bore 258 and inlet 226 will force the piston 260 in the direction of pilot bore 224 when pilot bore 224 is vented, and the pressure in the inlet 226, once the poppet 30 has sealed against the seat 100, will also push the stem 278, and thus piston 260, in the direction of the pilot bore 224.

Figure 12:
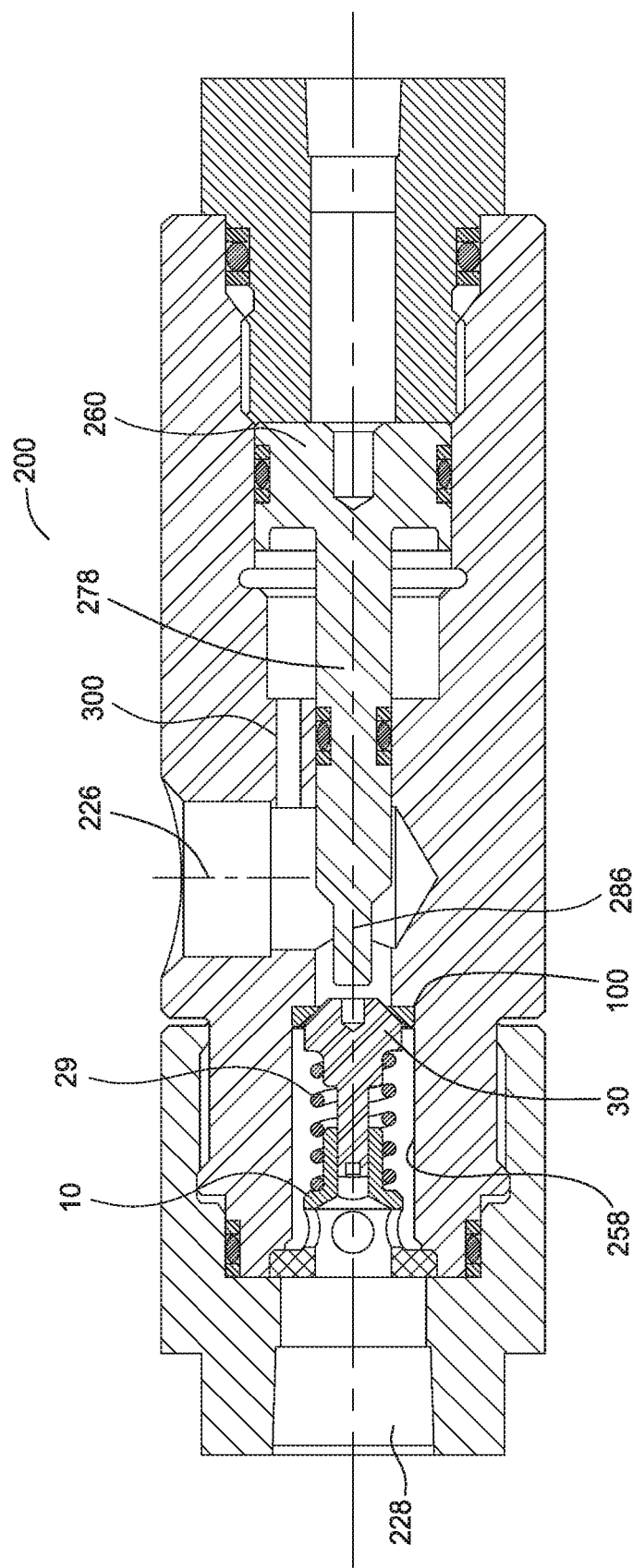
FIG. 12 is a sectional view of a further alternate construct of the valve of FIG. 7.

In FIG. 12, the vent 300 location is modified, so that it extends between the inlet 226 and the piston bore 252. In this configuration, in a steady state condition of the valve 200, the pressure at the inlet 226, being higher than in the pilot bore 224, communicates with the piston bore 252 and maintains the piston 260 against the first cap 214. Once the piston 260 has been actuated by a pressure in the pilot bore 224 to move the poppet 30 off of the seat 100 to relieve an overpressure condition at the outlet 228, and the pilot bore 224 is vented, pressure at the inlet 226 will again exceed that in the pilot bore 224, and the vent 300 will serve as an orifice to slowly increase the pressure against the piston 260 to urge it back into contact with the end cap 214.

Figure 13:
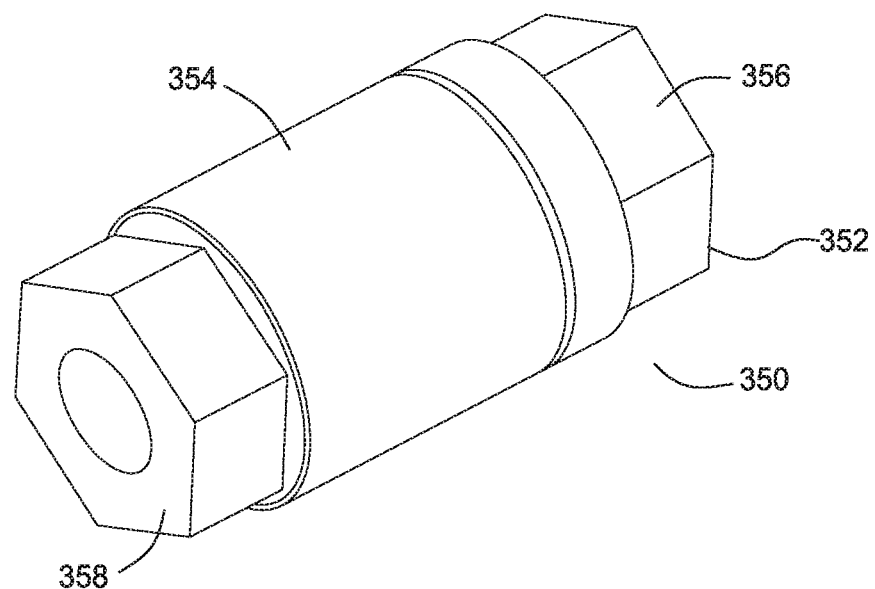
FIG. 13 is an isometric view of an alternative embodiment of a valve.
Figure 14:
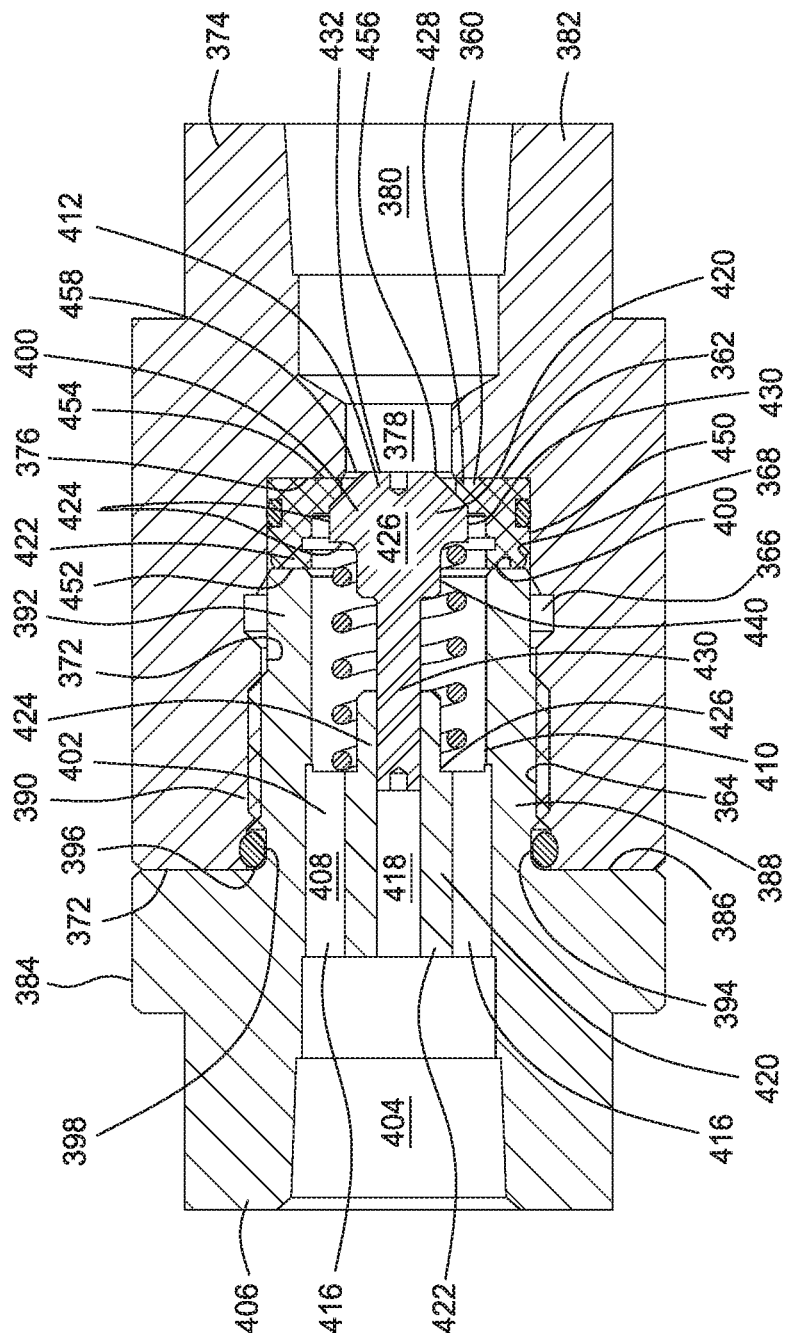
FIG. 14 is a sectional view of the valve of FIG. 13.
Figure 15:
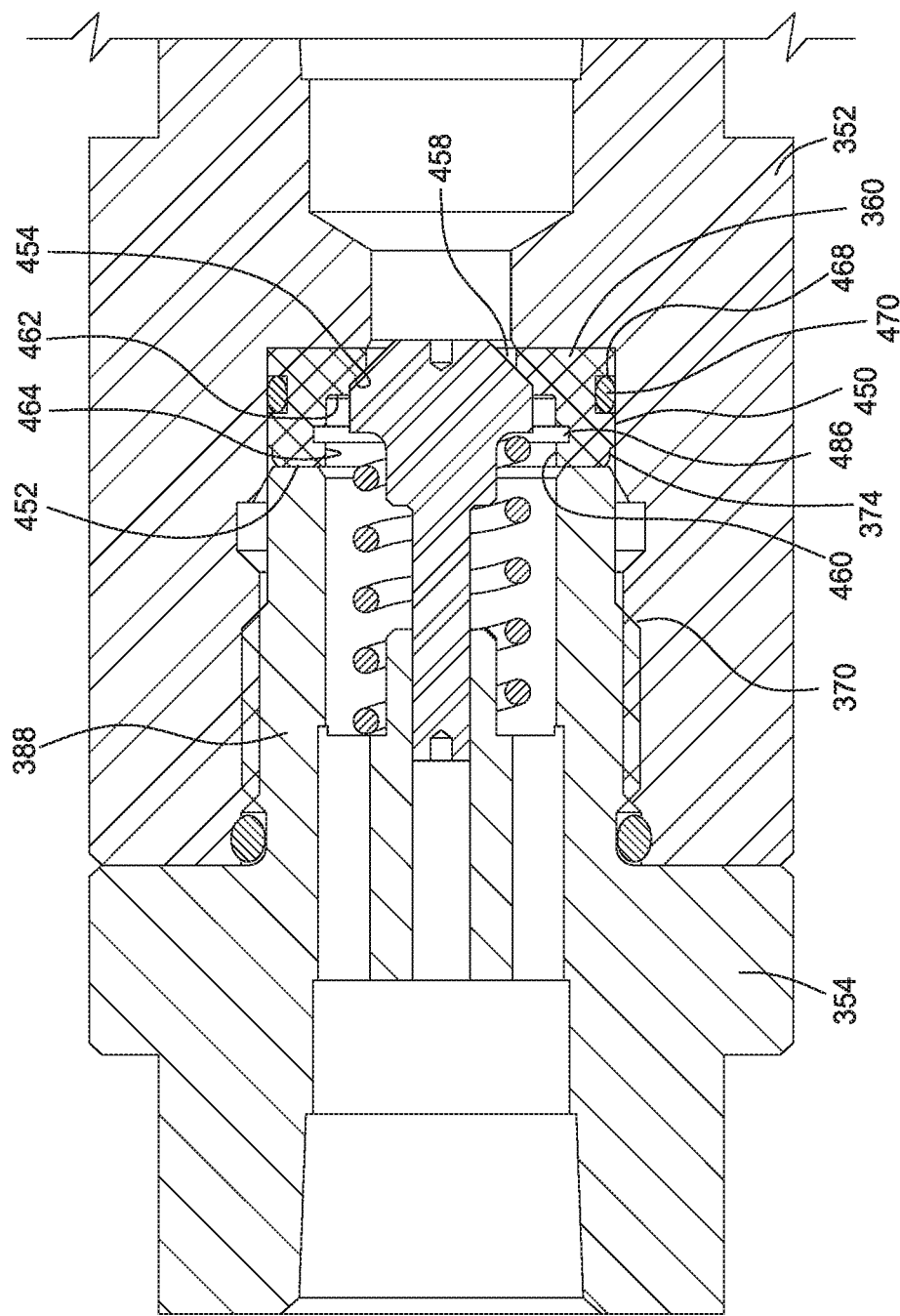
FIG. 15 is an enlarged view of a portion of the valve shown in FIG. 14.

Referring now to FIGS. 13 to 15, an additional embodiment of an in-line check valve 350 is shown. The valve 350 includes a female portion 352 and a male portion 354 which are threaded together. In the embodiment shown in FIG. 13, the female and male portions 352, 354 include at the distal ends thereof flatted portions 356, 358 which are configured in the shape of a hex headed nut to allow engagement thereof with a wrench to enable relative rotation of the female and male portions 352, 354 for connecting and disconnecting the female and male portions 352, 354.

Referring to FIG. 14, the valve 350 is shown in section, in a closed position. The in-line check valve 350 has the same general construct as the in-line check valve 1, except the seat 360, and the securement of the seat 360 in the seat bore 362, and the integration of the poppet guide 420 into the valve 350, are different. As with in-line valve 1, valve 350 includes a poppet guide 420, a seat 360, and a poppet 412 moveable with respect to the poppet guide 420 and the seat 360.

Female portion 352 includes an internally threaded bore 370 extending inwardly thereof from a first end 372 on a side thereof opposed to the flatted portion 354 thereof, which opens into a seat bore 362 within which seat 360 is located. A relief slot 366 extends circumferentially inwardly of the female portion between the internally threaded bore 370 and the seat bore 362. The relief slot 366 provides clearance for a cutter when cutting the internally threaded bore 370. The seat bore 362 terminates in an annular seat ledge 376, from which extends an inlet bore 378 extending into a fitting bore 380 which opens through the second end 382 of the female portion 352. Fitting bore is configured to receive a fitting, such as an NPT or SAE or other threaded fitting therein.

Male portion 354 includes a generally cylindrical body 384 extending from flatted portion 358, which terminates in an annular wall 386 from which a cylindrical boss 388 extends. Boss 388 includes an outer threaded portion 390 configured to threadingly engage the internally threaded bore 370 of female portion 352 adjacent to the annular wall 386, a seat securing portion 392 extending therefrom inwardly of the internally threaded bore 370, and poppet guide 422 integrally formed therein. A gap which forms a sealing face recess 394 is present between annular wall 386 and the threaded portion 390. The first end 372 of female portion 352 includes an annular, generally square, notch 396 at the intersection thereof with the internally threaded bore 370, and a seal 398, such as an o-ring, is received in the notch 396 to seal the connection of the female and male portions 352, 354. The distal end 400 of the boss 388 is located, with respect to the annular wall 386, to securely engage against one side of the seat 360, and thus in conjunction with the seat bore 362 and annular seat ledge 376, to secure the seat 360 in position in the seat bore 362 when the annular wall 388 contacts first end wall 372.

Male portion 354 is annular, and includes a bore 402 extending therethrough. Bore 402 includes outlet bore 404 configured to receive a fitting, such as an NPT or SAE or other threaded fitting therein. Outlet bore extends from end wall 406 of male portion 354 inwardly thereof to a plurality of bores 408 arranged annularly about poppet guide 422 which surround the poppet guide 422 integrally formed in male portion 354. Annular bore 408 opens into a poppet bore 410, within which the poppet 412 and poppet spring 414 are located.

In contrast to valve 1, the poppet guide 420 of in-line valve 350 is formed integrally in male portion 354. The poppet guide 422 is configured as an annular body 416 surrounding a hollow cylindrical guide passage 418. A first portion of the hollow annular body 416 is supported, and generally centered within the boss 388, by a plurality of webs 416 which form a portion of the side walls of the bores 408. A second portion 424 of the poppet guide 420 extends from the first portion in the direction of the seat 360. The hollow cylindrical guide passage 418 extends through both the first and second portions 422, 424, and on the exterior of the poppet guide 420, at the connection of the first and second portions 422, 424 a spring ledge 426 is formed.

Poppet 412 includes a generally circular stem 430 received in, and slidingly moveable in, the guide passage 418, and an enlarged head 420 including a lower annular limit ledge 422 facing the end of guide passage 418 and extending from a first circumferential wall 424 of the enlarged head, and a conical head 426 Conical head 426 includes a conical sealing face 428 extending between a second circumferential wall 440 of the enlarged head 420 and the end face 432 thereof which faces the inlet bore 378. On the underside of the conical head 426, and facing the poppet guide 420, an annular spring ledge 434 extends between first and second circumferential walls 424, 430.

Poppet spring 414 is located between, and on opposed ends thereof, contacts annular spring ledge 434 on the poppet 412 and spring ledge 426 on the poppet guide 420. As in valve 1, the poppet 360 and poppet guide 420 provide a spring guide which ensures alignment of the spring 414 with the poppet guide 420 and poppet 360, and thus reduce the likelihood of the poppet spring 414 buckling. Additionally, the distance between the end of the hollow cylindrical guide passage 418 closest to the spring ledge 434 and spring ledge 434, and the poppet spring 414, are sized to ensure that the 414 does not become disengaged from the annular limit spring ledge 426 and annular spring ledge 434 when the poppet 412 is fully seated in the seat 360, and also, if the poppet 412 is fully moved away from the seat 360, the annular limit ledge 422 engages the inwardly extending end of the poppet guide 420 wall before the spring is compressed to a solid condition, i.e., where the sides or flanks of the coils are all in contact along the length of the spring 414 commonly known as going solid.

As with the valve 1, the poppet 412 is biased against the seat 360 to close off flow through the valve 350, i.e. from inlet bore 378 to outlet bore 404, and the poppet 412 is moved away from the seat 360 when fluid pressure on the inlet bore 378 exceeds the force of the fluid pressure on the outlet 404 and of the force of the spring 414 biasing the poppet 412 against the seat 360, and fluid may flow from inlet bore 378 to outlet bore 404.

Referring now to FIG. 15, seat 360 is a generally annular member composed of a material such as Delran or PEEK, having an outer circumferential wall 450, a poppet side annular face 452, an inlet side annular face 454, a frustroconical inner wall 456 surrounding an opening 458 therethrough, and a counterbore 460 extending inwardly of the poppet side annular face 452 and forming an annular face 462 extending from the inner wall 464 of the counterbore 460 to the poppet side terminus of the frustroconical inner wall 456. A relief slot 486 extends inwardly of, and circumferentially around, the inner wall 464 of the counterbore 460. The relief slot 486 is provided to allow a tool (not shown) to be received therein to pull the seat 360 out of the female portion 352 for repair or replacement thereof. A seal bore 468, having a seal 470 such as an o-ring therein, extends inwardly of the outer circumferential wall 450 to seal against the seat bore 362.

To assemble valve 350, seal 470 is located in seal bore 368 in the seat 360, and the seat 360 is inserted through the internally threaded bore 370 and into the seat bore 362, such that it is against or nearly against the annular seat ledge 376. Poppet spring 414 is located over poppet guide 420, and the stem 430 of the poppet 412 is slid inwardly of the hollow cylindrical guide passage 418 of the poppet guide 420. The stem 430 and the hollow cylindrical guide passage 418 may comprise a key and slot arrangement, whereby a flat on one of the components is slidingly received in a recess in the other, which prevents rotation of the poppet 412. A seal 396 is located in notch 394, and the cylindrical boss 388 is inserted inwardly of the internally threaded bore 370 of the female portion 352 until the threaded portion 390 engages the threads on the internally threaded bore 370. Then the male portion 354, the female portion 352, or both are rotated to cause the distal end 400 of the cylindrical boss 388 to approach, and engage against, the poppet side annular face 452 of the seat 360. The distal end 400 of the cylindrical boss 388 pushes the seat 360 to seat the inlet side annular face 454 against the annular seat ledge 374 and secure it in position in the female portion 352 between the cylindrical boss 388 and the annular seat ledge 374. The length of the cylindrical boss from the annular wall 386 to distal end 400 thereof is sized to be at least as long as the distance from the first end 372 of the female portion 352 to the poppet side annular face 452 of the seat 360 when the inlet side annular wall 454 of the poppet 360 contacts, but is not significantly biased against, the annular seat wall 376. As a result of machining tolerances, and thermal expansion and compression of the parts, the seat may be compressed in the direction between poppet side annular face 452 and inlet side annular face 454. To prevent distortion of the frustroconical inner wall 456 of the seat 360 when such compression occurs, the relief slot 466 is provided, and the circumferential wall of the relief slot can buckle or bend to take up the compression in the relief slot, so that the frustroconical inner wall 456 of the seat 360 does not distort. Seal 470 allows the seat 360 to be sealed about its outer circumference, without the need for press fitting the seat 360 into the bore of the female portion 352.

Poppet 360 is movable with respect to the seat 360 in the same manner as the poppet of FIG. 1, and the operation of the poppet 360 is the same as that of the 30 of valve 1 as described in paragraph 35 hereof.

Figure 16:
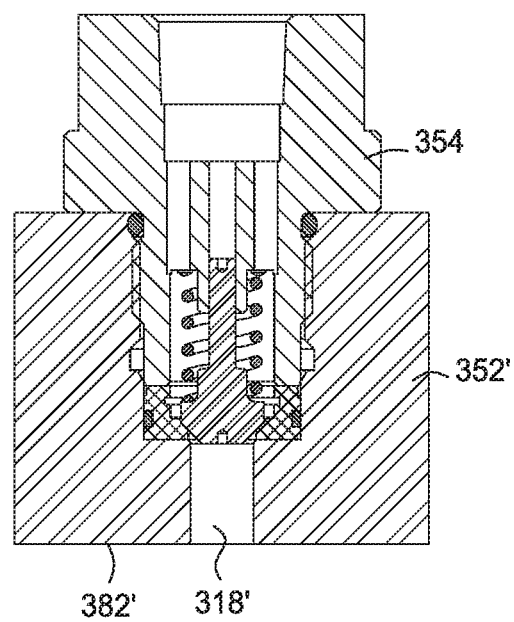
FIG. 16 is a sectional view of an alternate construct of the valve of FIG. 13.

Referring now to FIG. 16, an alternative embodiment of valve 350 is shown in section. In this embodiment, the female portion 352' of valve 350 is modified from that of the female portion 350, such that second end 382' is configured for mounting directly to a manifold, and inlet 318' terminates at the distal end portion 400 of the cylindrical boss 388 of male portion 354. The structure of valve 350' is otherwise the same as that of valve 350, and the operation is the same.

Figure 17:
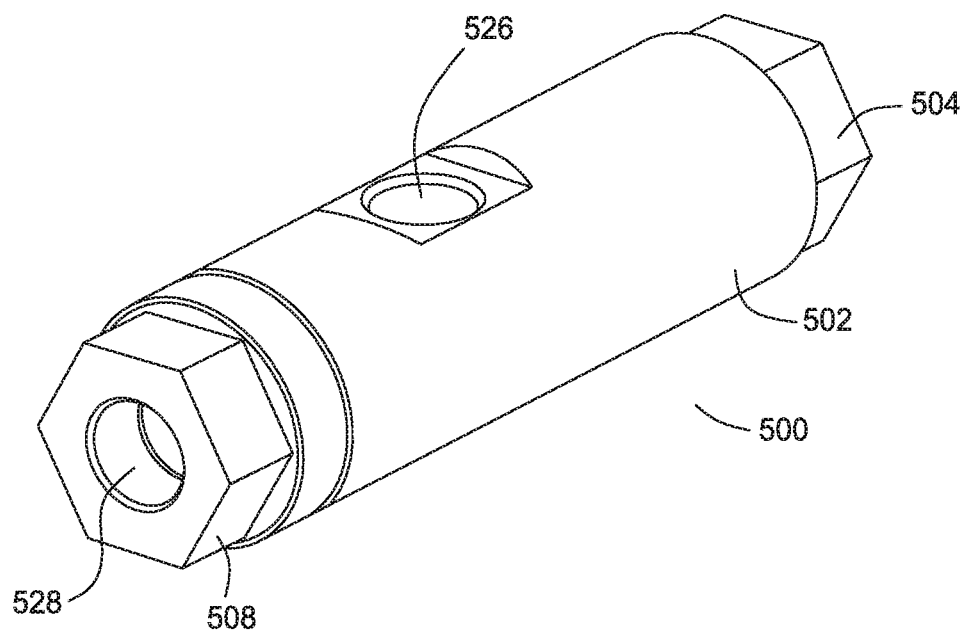
FIG. 17 is an isometric view of an alternative embodiment of a piloted piston poppet valve.
Figure 18:
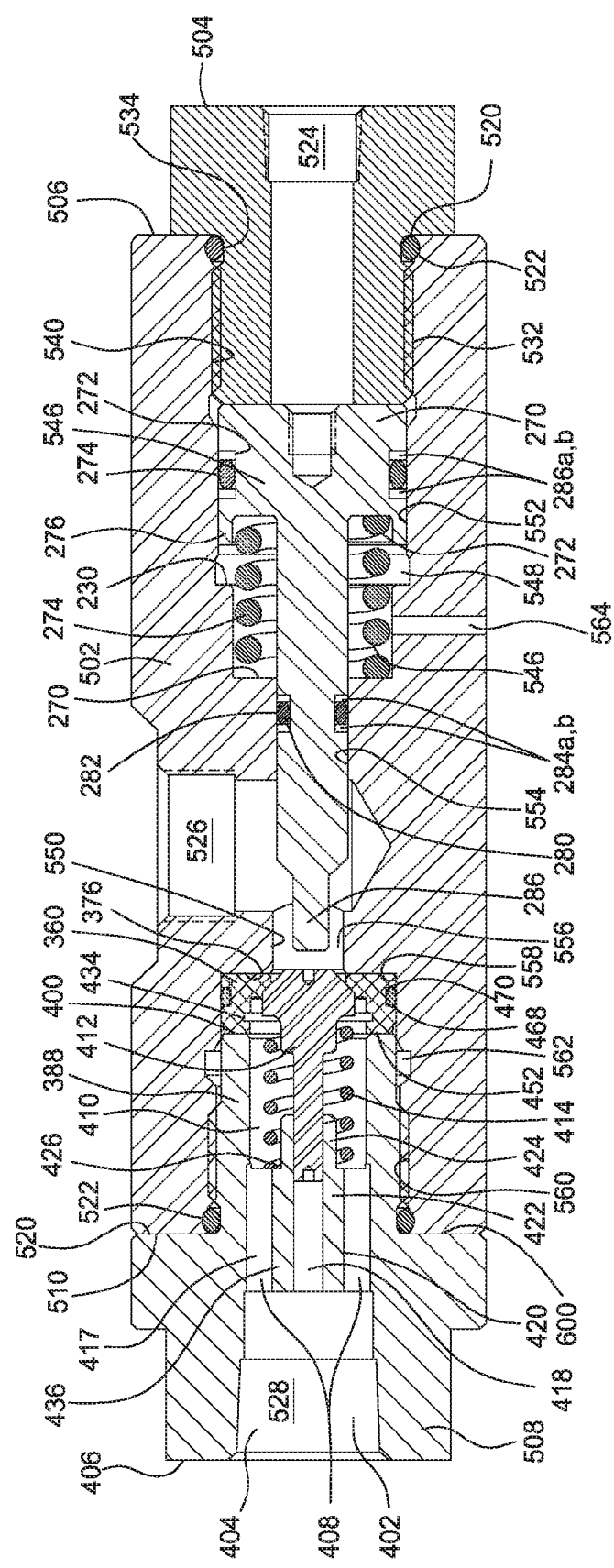
FIG. 18 is a sectional view of the valve of FIG. 17 having an external vent.

Referring now to FIGS. 17 and 18, and alternative embodiment of a piloted check valve 500 is shown. Valve 500 is similar in construct to valve 200 of FIGS. 7 to 10 hereof, and is configured to include a pilot to push the poppet off of the seat when a pilot control pressure is applied. Unlike valve 200, the pilot guide is formed integrally with one of the caps of the valve, and the cap having the pilot guide therein is also configured to secure the seat in place in the valve 500.

Valve 500 includes a main body 502 generally cylindrical in shape, a first cap 504 extending inwardly of a first end 506 of the main body 502 and sealingly engaged therewith through a seal 520 such as an o-ring, and a second cap 508 extending inwardly of a second end 510 thereof and sealingly engaged therewith through a seal 520 such as an o-ring secured in a notch 522 in the second end 510 of the main body 502. Extending inwardly (or outwardly) of valve 500 are a pilot bore 524 which is generally centered in the body of the first cap 504, a fluid inlet port 526 extending inwardly of the outer surface of the main body 502, and an outlet 528 extending through the second cap 508. In use, the valve 500 is configured to allow fluid to flow through the inlet port 526 and the main body 502 and out the outlet 528 when the pressure at the outlet 528 falls below a desired pressure, and close off the fluid flow path when the desired outlet 528 pressure, or a balance in pressure at the inlet port 526 and outlet 528, is achieved. Additionally, by providing a sufficient control pressure to the pilot bore 524 of the valve 500, a passage between the inlet 526 and outlet 528 is opened by moving the poppet 412 off of the seat 360, to allow relief of an overpressure condition at the outlet 528.

First cap 504 includes a head portion 530, from which extends a threaded portion 532, and a seal groove 534, having the seal 520 such as an o-ring and a back-up ring disposed therein. Threaded portion 532 of first cap 504 is threadingly received in a mating threaded bore 540 extending inwardly of first end 506 of the main body 502. Main body 502 is configured to include a passage 550, having different diameters at different locations, extending from the first end 506 to the second end 510 thereof. Poppet guide 420, integrally formed in the second cap 508, having the poppet 412 and poppet spring 414 assembled therewith, is received inwardly of the through bore 550 at the second end 510 of main body 502, and a control piston portion 546 extends inwardly of the through bore 550 inwardly of the first end 506 of the main body 502. Control piston portion 546 is operable to move the poppet 412 off of the seat 360 during an overpressure condition at valve outlet 528. Passage 550 includes the threaded bore 540 extending inwardly of first end 506 of main body 502, a piston bore 552 extending therefrom which terminates in fluid communication with a spring bore 546 having a smaller diameter than piston bore 552 and centered on the same axis, and a stem bore 554 extending therefrom to intersect with the inlet 526. A vent 564 extends from spring bore 546 to the exterior of the valve 500. From pilot bore 526, passage 550 extends as a lead bore 556 in the direction of outlet 528 and into seat bore 558. The poppet guide bore 560 extends from seat bore 558 and opens into the outlet 528 in second cap 508. An enlarged diameter circumferential relief 562 is provided between seat bore 558 and poppet guide bore 560, and enlarged diameter circumferential relief 548 is provided between piston bore 552 and spring bore 556. Poppet guide bore 560 is internally threaded.

Second cap 508 has the same configuration as male portion 354 of the valve 350, and seat 360, poppet spring 414 and poppet 412 have the same configuration as the same components in valve 350. Second cap 508 is annular, and includes a bore 402 extending therethrough. Bore 402 includes outlet bore 404 configured to receive a fitting, such as an NPT or SAE or other threaded fitting therein. Outlet bore 404 extends from end wall 406 of second cap 508 inwardly thereof to a plurality of individual bores 408 spaced around the poppet guide 420 and which surround the poppet guide 420. Annular bores 408 open into a poppet bore 410, within which the poppet 412 and poppet spring 414 are located.

A control piston portion includes a piston 270, having a seal groove 272 extending thereinward about its circumference, within which an o-ring 264 is sandwiched between opposed back up rings 266a, b. Piston 260 is slidingly received in piston bore 552, and the travel thereof in the longitudinal direction is limited in the direction away from the poppet bore 258 by engagement thereof against the innermost extent of the first cap 504, and in the direction toward the poppet guide bore 560 by an annular ledge 230 extending between the piston bore 552 and the guide bore 554.

At the connection of the piston bore 552 and the pilot bore 554, an annular spring ledge 270 is formed. A spring, such as a coil spring 274 is disposed between spring ledge 270 and inner recessed wall 272 of the piston 270 to provide a bias urging piston 270 in the direction away from the poppet 412. The annular inner facing recessed wall of the piston 270 is, in the embodiment, inwardly recessed into the end face of the piston 270, to form an annular spring retaining lip 276 which helps center the spring 274 with respect to the piston 270. The inner diameter of the annular retaining lip 276 and the inner diameter of the spring bore 546 are, within tolerance limits, the same, and are also centered, within tolerance limits, along the centerline of the valve 500. Thus, the inner surface of the annular retaining lip 276 and of the spring bore 546 form a spring guide to maintain the alignment of the spring 274 along the length of the piston stroke. A poppet stem 278 is a generally right cylindrical integral extension of piston 260 having a seal groove 280 inwardly of the outer circumference thereof, within which a seal ring such as an o-ring 282, sandwiched between opposing back up rings 284a, b, is received. O ring 282 provides the seal between poppet stem 278 and stem bore 554, and also helps center the poppet stem 278 in the stem bore 554 and the lead bore 556. Likewise, seal 264 seals the interface between piston 260 and piston bore 552. Poppet stem 278 includes, at the end thereof distal from the piston 260, a reduced diameter portion 286, to provide a reduced area annular passage between the reduced diameter portion 286 and the inner surface of the lead bore 256.

In contrast to valve 200, the poppet guide 420 of 500 is formed integrally in male portion 354. The poppet guide 420 is configured as an annular body 416 surrounding a hollow cylindrical guide passage 418. A first portion 422 of the hollow annular body 416 is supported, and generally centered within the boss 388, by a plurality of webs 417 which form a portion of the side walls of the bores 408. A second portion 424 of the poppet guide 420 extends from the first portion in the direction of the seat 360. The hollow cylindrical guide passage 418 extends through both the first and second portions 422, 424, and on the exterior of the poppet guide 420 at the connection of the first and second portions 422, 424 a spring ledge 426 is formed.

Figure 19:
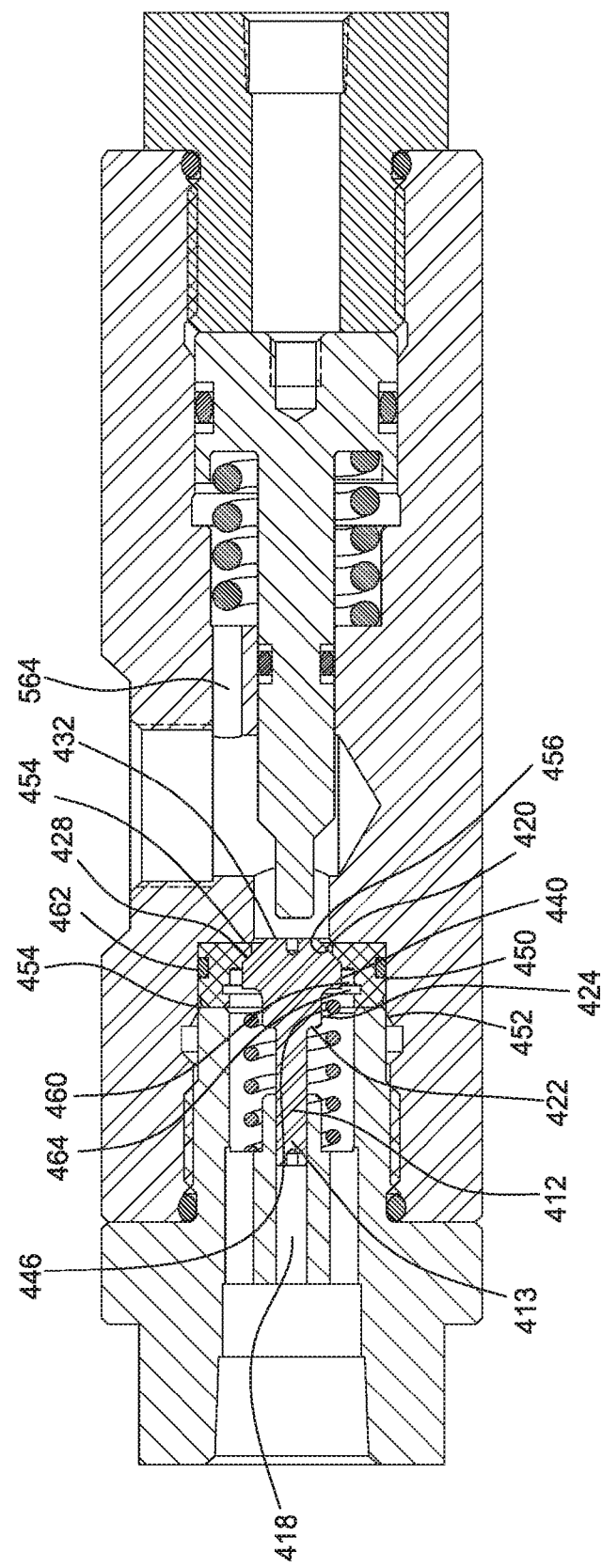
FIG. 19 is a sectional view of the valve of FIG. 16 having an internal vent.

Referring to FIG. 19 for clarity, poppet 412 includes a generally circular stem 430 received in, and slidingly moveable in, the guide passage 418, and an enlarged head including a lower annular limit ledge 422 facing the end of guide passage 418 and extending radially inwardly from a first circumferential wall 424 of the enlarged head, and a conical head 426. Conical head 426 includes a conical sealing face 428 extending between a second circumferential wall 440 of the enlarged head 420 and the end face 432 thereof which faces the inlet bore 378. On the underside of the conical head 426, and facing the poppet guide 420, an annular spring ledge 434 extends between first and second circumferential walls 424, 430

Poppet spring 414 is located between, and on opposed ends thereof, contacts annular spring ledge 434 on the poppet 412 and spring ledge 426 on the poppet guide 420. As in valve 1, the poppet 360 and poppet guide 420 provide a spring guide which ensures alignment of the spring with the poppet guide 420 and poppet 360, and thus reduce the likelihood of the poppet spring 414 buckling. Additionally, the distance between the end of the hollow cylindrical guide passage 418 closest to the spring ledge 434 and spring ledge 434, and the poppet spring 414, are sized to ensure that the 414 does not become disengaged from the annular limit spring ledge 426 and annular spring ledge 434 when the poppet 412 is fully seated in the seat 360, and also, if the poppet 412 is fully moved away from the seat 360, the annular limit ledge 422 engages the inwardly extending end of the poppet guide 420 wall before the spring is compressed to a solid condition, i.e., where the sides or flanks of the coils are all in contact along the length of the spring 414 commonly known as going solid.

Poppet spring 414 is located between, and on opposed ends thereof, contacts annular spring ledge 434 on the poppet 412 and spring ledge 426 on the poppet guide 420. The poppet 360 and poppet guide 420 provide a spring guide which ensures alignment of the spring 414 with the poppet guide 420 and poppet 360, and thus reduce the likelihood of the poppet spring 414 buckling. Additionally, the distance between the end of the hollow cylindrical guide passage 418 closest to the spring ledge 434 and spring ledge 434, and the poppet spring 414, are sized to ensure that the poppet spring 414 does not become disengaged from the annular limit spring ledge 426 and annular spring ledge 434 when the poppet 412 is fully seated in the seat 360, and also, if the poppet 412 is fully moved away from the seat 360, the annular limit ledge 422 engages the inwardly extending end of the poppet guide 420 wall before the spring is compressed to a solid condition, i.e., where the sides or flanks of the coils are all in contact along the length of the spring 414 commonly known as going solid.

Seat 360 is a generally annular member composed of a material such as Delran or PEEK, having the same configuration as that of seat 100, and poppet 412 interacts therewith in the same manner that poppet 30 interacts with seat 100. Valve 500 operates in the same manner as valve 200 hereof. Thus when the pressure at inlet bore 526 exerts a force on end face 432 of poppet 412 which exceeds the force exerted on the poppet by the pressure at outlet bore 528 and the spring 414, the poppet 412 will move away from the seat 360, and fluid will flow from the inlet 526 to the outlet 528 until the pressure at the outlet is close to the inlet bore 526 pressure, and the spring 414 will tend to close the poppet 412 against the seat. However, in some situations, an overpressure can occur in the outlet 528, and the pressure in the inlet bore 526 will be insufficient to cause the poppet 412 to move off of the seat 360. Thus, a control pressure may be applied to the pilot bore 554, sufficient, in addition to the force on the end face 432 of the poppet 412 sufficient to push the poppet 412 off of the seat 360.

Figure 20:
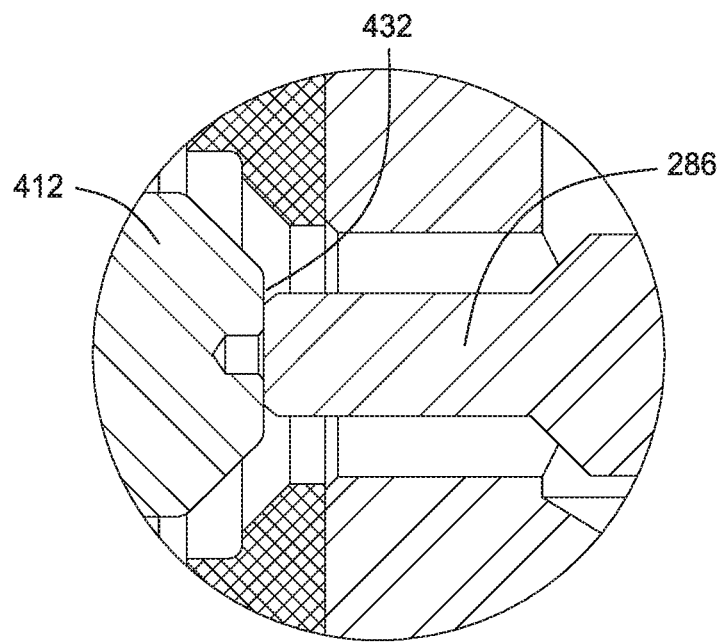
FIG. 20 is an enlarged view of the pilot, valve and seat of FIGS. 17 and 18 showing the valve in an open position.
Figure 21:
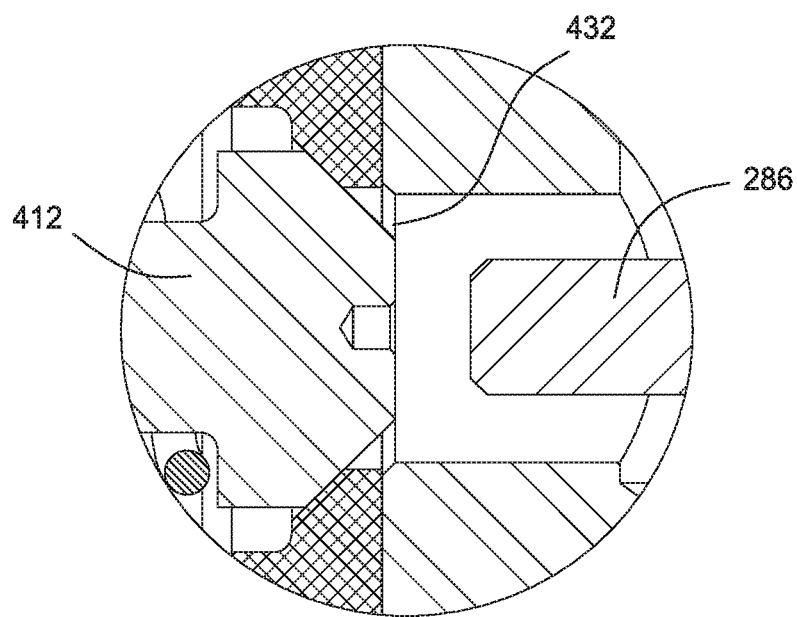
FIG. 21 is an enlarged view of the pilot, valve and seat of FIGS. 17 and 18 showing the valve in a closed open position.

As shown in FIGS. 18 and 21, the piston 270 is normally maintained in a retracted state, wherein the piston 270 is pushed against the first cap 504 by the coil spring 274, and the reduced diameter portion 286 of the poppet stem 278 is spaced away from the end face 432 of the poppet 412. When sufficient control pressure is applied to pilot bore 524, the piston 270 moves in the direction of the poppet 412, and the reduced diameter portion 286 of the poppet stem 278 engages the end face 432 of the poppet 412 to push the poppet off of the seat 360 and enable flow from inlet 526 to outlet 528 as shown in FIG. 20. Once the pressure is close to being equalized between inlet 526 and outlet 528, control pressure is vented, and the piston 270 toward the first cap 504 and the poppet stem 278 retracts, causing the valve 500 to close.

In the embodiment of valve 500 shown in FIGS. 17 and 18, the pressure in the spring bore 546 is vented to the exterior of the valve 500 through vent 564. As a result, the pressure of the inlet bore 526 pushes against only the cross section of the poppet stem 278 against the pressure in the pilot bore 524.

In the embodiment of the valve 50 shown in FIG. 19, the vent 564 extends from the spring bore 546 to communicate directly with the inlet bore 526. As a result, the pressure of the inlet bore 526 bears on the entire circumference of the piston, and a higher control pressure, for the same inlet bore 526 pressure and outlet 528 pressure is required to move the poppet 412 off the seat 360 when an overpressure condition exists in the outlet 528. Again, the dimensional relationships and their effect on the operation of the valve as set forth in paragraph 35 hereof apply to operation of the valve 500.

To assemble the valve 500, spring 278 and piston 260, with the back-up rings 266*a* and seal 266 in the seal groove 262 thereof, are inserted inwardly of the piston bore 552, and the threaded portion 532 of the first cap 504 is threaded into the threaded bore 540 of the main body 212. Seal 470 is the located in seal bore 368 in the seat 360, and the seat 360 is inserted through the internally threaded bore 560 and into the seat bore 558, such that it is against or nearly against the annular seat ledge 376. Poppet spring 414 is located over poppet guide 420, and the stem 430 of the poppet is slid inwardly of the hollow cylindrical guide passage 418 of the poppet guide 420. A seal 522 is located in notch 520, and the cylindrical boss 388 of second cap 508 is inserted inwardly of the internally threaded bore 560 of the main body 502 until the threaded portion 390 engages the threads on the internally threaded bore 560. Then the caps 504, 508 are rotated with respect to the main body 502 to cause the distal end 400 of the cylindrical boss 388 to approach, and engage against, the poppet side annular face 452 of the seat 360. The distal end 400 of the cylindrical boss 388 pushes the seat 360 to seat the opposed annular face 454 against the annular seat ledge 374 and secure it in position in the main body 502 between the cylindrical boss 388 and the annular seat ledge 374. The length of the boss 388 from the annular wall 600 of second cap 508 to distal end 400 of the boss 388 thereof is sized to be at least as long as the distance from the first end 372 of the female portion 352 to the poppet side annular face 452 of the seat 360 when the inlet side annular wall 454 of the poppet 360 contacts, but is not significantly biased against, the annular seat wall 376. As a result of machining tolerances, and thermal expansion and compression of the parts, the seat may be compressed in the direction between poppet side annular face 452 and inlet side annular face 454. To prevent distortion of the frustroconical inner wall 456 of the seat 360 when such compression occurs, the relief slot 466 is provided, and the circumferential wall of the relief slit can buckle or bend to take up the compression in the relief slot, so that the frustroconical inner wall 456 of the seat 360 does not distort.

The invention claimed is:
1. A valve comprising:
a first housing having a first bore extending thereinto and including a counterbored recess extending around the opening of the first bore from the first housing and terminating at an annular seat retainer surface;
a seat, having an opening therein, received within and aligned to the first bore;
a second housing releasably fixedly connected to the first housing, the second housing comprising a cylindrical boss extending therefrom inwardly from the opening of the counterbored recess into the first housing and including a boss bore having a circumferential wall having a first diameter, the circumferential wall having a continuous surface extending thereinto, the cylindrical boss terminating at an end face and including an integral poppet guide therein, the poppet guide spaced from the seat, the seat releasably secured against the seat retainer surface by the cylindrical boss, and the poppet guide spaced from the boss bore wall; and
a poppet reciprocally located in the integral poppet guide; wherein the end face of the cylindrical boss engages against the seat and biases the seat against the annular seat retainer surface, the integral poppet guide further comprises a guide passage therein aligned to the first bore, the poppet includes a head portion and a stem extending therefrom and into the guide passage, and the cylindrical boss axially overlaps the location of the integral poppet guide.

2. The valve of claim 1, further comprising a third housing operatively connected to the first housing, a variable pressure bore, and including a piston exposed to the variable pressure bore on a first side, and having an integral piston stem extending therefrom on a side thereof opposite to the variable piston bore facing side thereof, the piston selectively positionable between a first position wherein the piston stem is spaced from a portion of the poppet extending over the opening in the seat, and a second position at which the piston stem engages the poppet and moves it away from the seat.

3. The valve of claim 2, wherein the seat comprises an annular body including an annular sealing side including a first annular sealing face, a second annular sealing face, and an annular intermediate portion extending therebetween, the first annular sealing face surrounding an opening through the seat.

4. The valve of claim 2, wherein the first bore further includes a piston bore having a first circumference and a stem bore having a second circumference smaller than the first circumference;

the stem bore interposed between the piston bore and the second body;

the variable pressure bore in the third body opening into the piston bore; and the piston disposed solely in the piston bore.

5. The valve of claim 4, further comprising a biasing member disposed between the piston and the stem bore and configured to bias the piston toward the third body.

6. The valve of claim 5, wherein the biasing member is a spring.

7. The valve of claim 4, further comprising a vent passage extending through the first body and outwardly thereof, the vent passage providing fluid communication between the piston bore and the region exteriorly of the first body.

8. The valve of claim 1, wherein second housing is releasably fixedly connected to the first housing by mating threads on the first and second housings.

9. The valve of claim 1, wherein the first bore further comprises a piston bore and a piston, having an integral piston stem extending therefrom, disposed in the piston bore, the piston selectively positionable in the piston bore between a first position wherein the piston stem is spaced from a portion of the poppet extending over the opening in the seat, and a second position at which the piston stem engages the poppet and moves it away from the seat.

10. The valve of claim 9, wherein the piston bore comprises a first circumference, the first body further comprising a stem bore having a second circumference smaller than the first circumference and through which the piston stem extends, the stem bore interposed between the piston bore and the second body.

11. The valve of claim 10, further comprising a biasing member disposed between the piston and the stem bore and configured to bias the piston in the direction away from the first body.

12. The valve of claim 11, wherein the biasing member is a spring.

13. The valve of claim 9, further comprising a vent passage extending through the first body and outwardly thereof, the vent passage providing fluid communication between the piston bore and the region exteriorly of the first body.

14. A valve comprising:

a first housing having a first bore extending thereinto and including a counterbored recess extending around the opening of the first bore from the first housing and terminating at an annular seat retainer surface;

a seat, having an opening therein, received within and aligned to the first bore;

a second housing releasably fixedly connected to the first housing, the second housing comprising a second bore extending inwardly of an outer surface thereof and a cylindrical boss extending therefrom inwardly from the opening of the counterbored recess into the first housing and including a boss bore having a circumferential wall extending thereinto, the cylindrical boss terminating at an end face, and an integral poppet guide spaced from the seat and terminating at a location inwardly of the first bore in a poppet guide end face, the seat releasably secured against the seat retainer surface by the cylindrical boss, and the poppet guide spaced from the boss bore circumferential wall and the end face of the poppet guide spaced from the seat to form a first fluid volume between the end face of the poppet guide and the seat and bounded by a portion of the circumferential wall;

at least one flow passage extending between the poppet guide and the circumferential wall, and fluidly connecting the second bore with the first fluid volume;

a poppet reciprocally located in the integral poppet guide; wherein the end face of the cylindrical boss engages against the seat and biases the seat against the annular seat retainer surface.

15. The valve of claim 14, wherein the first bore further includes a piston bore having a first circumference and a stem bore having a second circumference smaller than the first circumference;

the stem bore interposed between the piston bore and the second body;

the variable pressure bore in the third body opening into the piston bore; and the piston disposed solely in the piston bore.

16. The valve of claim 15, further comprising a biasing member disposed between the piston and the stem bore and configured to bias the piston toward the third body.

17. The valve of claim 16, wherein the biasing member is a spring.

18. The valve of claim 15, further comprising a vent passage extending through the first body and outwardly thereof, the vent passage providing fluid communication between the piston bore and the region exteriorly of the first body.

19. The valve of claim 14, wherein the first bore further comprises a piston bore and a piston, having an integral piston stem extending therefrom, disposed in the piston bore, the piston selectively positionable in the piston bore between a first position wherein the piston stem is spaced from a portion of the poppet extending over the opening in the seat, and a second position at which the piston stem engages the poppet and moves it away from the seat.

20. The valve of claim 19, wherein the piston bore comprises a first circumference, the first body further comprising a stem bore having a second circumference smaller than the first circumference and through which the piston stem extends, the stem bore interposed between the piston bore and the second body.

21. The valve of claim 20, further comprising a biasing member disposed between the piston and the stem bore and configured to bias the piston in the direction away from the first body.

22. The valve of claim 19, further comprising a vent passage extending through the first body and outwardly thereof, the vent passage providing fluid communication between the piston bore and the region exteriorly of the first body.

* * * * *